US010834066B2

(12) United States Patent
Joffe et al.

(10) Patent No.: US 10,834,066 B2
(45) Date of Patent: *Nov. 10, 2020

(54) SECURE DOMAIN NAME SYSTEM

(71) Applicant: Neustar, Inc., Sterling, VA (US)

(72) Inventors: Rodney Lance Joffe, Tempe, AZ (US); Victor Joseph Oppleman, Virginia Beach, VA (US); David Link King, Cave Creek, AZ (US); Brett Dean Watson, Scottsdale, AZ (US); Andrew Jackson, Sterling, VA (US); Sean Leach, Castle Pines, CO (US)

(73) Assignee: Neustar, Inc., Sterling, VA (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/991,956

(22) Filed: May 29, 2018

(65) Prior Publication Data
US 2018/0278598 A1 Sep. 27, 2018

Related U.S. Application Data

(63) Continuation of application No. 15/478,011, filed on Apr. 3, 2017, now abandoned, which is a continuation
(Continued)

(51) Int. Cl.
*G06F 21/00* (2013.01)
*H04L 29/06* (2006.01)
(Continued)

(52) U.S. Cl.
CPC ............ *H04L 63/08* (2013.01); *H04L 9/3247* (2013.01); *H04L 61/1511* (2013.01);
(Continued)

(58) Field of Classification Search
CPC ......... H04L 63/08; H04L 9/32; H04L 9/3247; H04L 61/1511; H04L 63/1441; G06F 2221/2129; G06F 21/44
See application file for complete search history.

(56) References Cited

U.S. PATENT DOCUMENTS 7,620,733 B1* 11/2009 Tzakikario .......... H04L 61/1511
709/245
9,172,713 B2 10/2015 Joffe et al.
(Continued)

OTHER PUBLICATIONS

RFC 2535, "Domain Name System Security Extensions", Network Working Group, D. Eastlake, IBM, Mar. 1999 (Year: 1999).*
(Continued)

*Primary Examiner* — Alexander Lagor
(74) *Attorney, Agent, or Firm* — Sterne, Kessler, Goldstein & Fox P.L.L.C.

(57) ABSTRACT

A method and system for authenticating answers to Domain Name System (DNS) queries originating from recursive DNS servers provided. A verification component provides a versification that a DNS query originated from the recursive DNS server. An authoritative DNS server receives the query via a network, such as the Internet, provides an answer to the query to an authentication component. The authentication component then provides an authentication such as a digital signature, which confirms that the received answer was provided by the authoritative DNS server, and then communicates the answer and the authentication to the verification component via the network. The verification component then verifies that the authentication corresponds to the receive answer and sends the answer to the recursive DNS server. When the verification component receives an answer in the absence of a corresponding authentication the verification component drops the answer.

20 Claims, 17 Drawing Sheets

Related U.S. Application Data of application No. 14/922,486, filed on Oct. 26, 2015, now Pat. No. 9,648,004, which is a continuation of application No. 12/237,144, filed on Sep. 24, 2008, now Pat. No. 9,172,713.

(51) Int. Cl.
*H04L 29/12* (2006.01)
*H04L 9/32* (2006.01)

(52) U.S. Cl.
CPC ........ *H04L 63/126* (2013.01); *H04L 63/1408* (2013.01); *H05K 999/99* (2013.01); *H04L 63/14* (2013.01)

(56) References Cited

U.S. PATENT DOCUMENTS

| | | | |
|---|---|---|---|
| 9,648,004 B2 | 5/2017 | Joffe et al. | |
| 9,871,794 B2 | 1/2018 | Joffe et al. | |
| 9,979,588 B1 | 5/2018 | Benson et al. | |
| 2002/0009079 A1 | 1/2002 | Jungck et al. | |
| 2003/0070096 A1* | 4/2003 | Pazi | H04L 29/12066 726/4 |
| 2006/0143458 A1 | 6/2006 | Tie et al. | |
| 2007/0253377 A1 | 11/2007 | Janneteau et al. | |
| 2008/0086574 A1 | 4/2008 | Raciborski et al. | |
| 2012/0173760 A1 | 7/2012 | Jog et al. | |
| 2012/0233657 A1 | 9/2012 | Guevin et al. | |
| 2014/0282847 A1 | 9/2014 | Blacka et al. | |
| 2016/0241509 A1 | 8/2016 | Akcin | |
| 2017/0339122 A1 | 11/2017 | Joffe et al. | |
| 2018/0109527 A1 | 4/2018 | Joffe et al. | |
| 2018/0131665 A1 | 5/2018 | Joffe et al. | |

OTHER PUBLICATIONS

RFC 2535, "Domain Name System Security Extensions," Network Working Group, D. Eastlake, IBM, Mar. 1999, 47 pages.

* cited by examiner

SECURE DOMAIN NAME SYSTEM

This application is a continuation of U.S. patent application Ser. No. 15/478,0111 filed Apr. 3, 2017, which is a continuation of U.S. patent application Ser. No. 14/922,486 filed Oct. 26, 2015, now U.S. Pat. No. 9,648,004, which is a continuation of U.S. patent application Ser. No. 12/237,144, filed Sep. 24, 2008, now U.S. Pat. No. 9,172,713, issued Oct. 27, 2015, the contents of all incorporated by reference.

BACKGROUND OF THE INVENTION

Field of the Invention

The present invention relates to the field of domain names, as used on the Internet and the World Wide Web. More particularly, the invention relates to the security of the domain name system.

Related Art

The Domain Name System (DNS) protocol has a long history of vulnerabilities and there have been a myriad of threats to the global DNS infrastructure for many years. The most prevalent threats have been Distributed Denial of Service (DDoS) attacks and cache poisoning attacks. Most conventional attack vectors have had reasonably simple solutions to prevent or mitigate these attacks.

Recently, Dan Kaminsky of Doxpara Research discovered a long latent combination of flaws in the DNS protocol that allows an attacker to poison any DNS resolver cache for any zone or resource record in the cache in a matter of seconds (for a detailed description of the flaw see the following: http://www.unixwiz.net/techtips/iguide-kaminsky-dns-vuln.html). In summary, an attacker makes a DNS query against a recursive resolver, which then forwards the query to the appropriate authoritative DNS server. The attacker then floods the recursive server with poisoned answers, posing as the authoritative server (spoofing) and exploiting the combination of flaws that Kaminsky discovered to win the race against the "true" answer from the authoritative server.

In response to this new vulnerability, vendors collaborated together with Dan Kaminsky and other industry experts on a plan to patch the flaw, and simultaneously released the patch on Jul. 8, 2008. The patch was believed to sufficiently increase the complexity of exploiting this flaw, giving the industry time to deploy DNS Security Extensions (DNSSEC), which most experts believe is the ultimate solution to DNS security problems.

However, on Aug. 8, 2008, a group of researchers from the Russian Federation discovered that a well crafted attack against fully patched resolvers could still succeed in approximately 10 hours. Dan Kaminsky commented on this revelation in his blog: "What was once possible via 32,769 packets, is still possible via between 134,217,728 and 4,294,967,296 packets."

Adding to the severity of the problem, approximately one week after the Russian report, a major Internet service provider (ISP) found over 100 fully patched, recursive DNS servers within their infrastructure that had been "brute force" poisoned for a very popular web site visited by Internet Relay Chat (IRC) users. The patch that experts previously believed would provide enough time to get DNSSEC deployed literally provided the industry just a few extra weeks.

Some experts believed that utilizing Hypertext Transfer Protocol over Secure Sockets Layer (HTTPS) was a means to protect DNS as the Secure Sockets Layer (SSL) certificate has to be generated by a known certificate provider. However, the nature of the flaw allows e-mail messages to be intercepted and forged, thus making it possible for anyone to register a certificate, for example, www.amazon.com, and some certificate providers only require e-mail messages to the owner of the domain to be confirmed. With a newly generated and valid certificate, HTTPS does not protect a company from this flaw.

SUMMARY OF THE INVENTION

In one aspect, the invention provides a system for a system for authenticating answers to Domain Name System (DNS) queries originating from recursive DNS servers. The system comprises: a verification component in serial communication with a recursive DNS server, the verification component being configured to receive a DNS query from the recursive DNS server and to provide a first verification that the query originated from the recursive DNS server; a first authentication component in communication with the verification component via a network, the first authentication component being configured to receive the DNS query and the first verification from the first component, and to provide a confirmation that the first verification corresponds to the received DNS query; and a first authoritative DNS server in serial communication with the first authentication component, the first authoritative DNS server being configured to provide an answer to the DNS query and to transmit the answer to the first authentication component. The first authentication component is further configured to receive the answer to the DNS query from the first authoritative DNS server and to provide an authentication that the received answer was provided by the first authoritative DNS server, and to communicate the received answer and the authentication to the verification component via the network. The verification component is further configured to receive the answer to the DNS query and to receive the authentication, and to verify that the authentication corresponds to the received answer. The network may comprise the Internet and/or the World Wide Web. The authentication may include a digital signature. When the verification component receives an answer in the absence of a corresponding authentication, the verification component may be configured to prevent the answer from being communicated to the recursive DNS server.

The system may further include a second authentication component, the second authentication component being in serial communication with both of the first authentication component and the first authoritative DNS server, and the second authentication component being configured identically as the first authentication component to provide redundancy. The second authentication component may be configured to receive the DNS query and the first verification from the verification component via the network and the first authentication component, and to provide a confirmation that the first verification corresponds to the received DNS query, and to transmit the DNS query and the confirmation to the authoritative DNS server. The second authentication component may be further configured to receive the answer from the authoritative DNS server component and to provide an authentication that the received answer was provided by the authoritative DNS server component, and to communicate the received answer and the authentication to the verification component via the first authentication component and the network.

Alternatively, the system may include a second authentication component and a second authoritative DNS server, the second authentication component being in communication with the verification component via the network. The second authentication component may be configured to receive the DNS query and the first verification from the verification component when the first authentication component is not functioning properly, and to provide a confirmation that the first verification corresponds to the received DNS query. The second authoritative DNS server may be in serial communication with the second authentication component. The second authoritative DNS server component may be configured to provide an answer to the DNS query and to transmit the answer to the second authentication component. The second authentication component may be further configured to receive the answer to the DNS query from the second authoritative DNS server and to provide an authentication that the received answer was provided by the second authoritative DNS server component, and to communicate the received answer and the authentication to the verification component via the network. The verification component may be further configured to receive the answer to the DNS query and to receive the authentication, and to verify that the authentication corresponds to the received answer.

In another aspect, the invention provides a method of verifying an authenticity of an answer to a Domain Name System (DNS) query originating from a recursive DNS server. The method comprises the steps of: receiving the DNS query from the recursive DNS server; providing a verification that the DNS query originated from the recursive DNS server; communicating the DNS query and the verification to an authoritative DNS server via a network; and receiving an answer to the DNS query and an authentication corresponding to the received answer. The authoritative DNS server is configured to transmit the answer to a component that is configured to provide an authentication corresponding to the answer and to communicate the authentication in conjunction with the answer. The network may comprise the Internet and/or the World Wide Web. The authentication may include a digital signature. When an answer to the DNS query is received in the absence of a corresponding authentication, the method may further include the step of dropping the received answer.

When an answer to the DNS query is received in the absence of a corresponding authentication, the method may further include the steps of: re-communicating the DNS query and the verification to the authoritative DNS server via the network; and receiving a second answer to the DNS query and an authentication corresponding to the received second answer. Alternatively, when an answer to the DNS query is received in the absence of a corresponding authentication, the method may further include the steps of: communicating the DNS query and the verification to a second authoritative DNS server via the network; and receiving a second answer to the DNS query and an authentication corresponding to the received second answer. The second authoritative DNS server may be configured to transmit the second answer to a component that is configured to provide an authentication corresponding to the second answer and to communicate the authentication in conjunction with the second answer.

In yet another aspect, the invention provides a method of authenticating an answer to a Domain Name System (DNS) query originating from a recursive DNS server. The method comprises the steps of: receiving the DNS query from the recursive DNS server via a network; communicating the received DNS query to an authorized DNS server; receiving an answer to the DNS query from the authorized DNS server; providing an authentication corresponding to the received answer; and communicating the received answer and the authentication to the recursive DNS server via the network. The network may comprise the Internet and/or the World Wide Web. The authentication may include a digital signature. The method may further include the step of receiving a verification that the received DNS query was actually originated by the recursive DNS server, wherein the step of receiving a verification occurs prior to the step of communicating the received DNS query to the authorized DNS server.

DETAILED DESCRIPTION OF THE INVENTION

The present inventors have developed a secure DNS solution to authenticate and protect authoritative DNS answers for queries originating from recursive DNS servers in partner Internet service provider (ISP) networks. Accordingly, the present invention provides an end-to-end solution that ensures any cache poisoning attempts between authoritative DNS servers and ISP recursive servers can be identified and dropped, thereby allowing only legitimate authoritative answers to reach recursive servers. In summary, the basic concept provides:

A mechanism for authoritative DNS servers to identify recursive queries from a participating ISP that is destined for any authoritative servers;

A process to authenticate the answer provided by the authoritative DNS server by digitally signing the answer for the query, using a device referred to herein as an authentication component or a signer;

A mechanism for a participating ISP to verify that the authoritative answer is indeed from a true authoritative DNS server, using a device referred to herein as a verification component or a verifier; and A passive "heartbeat" function between signers and verifiers to protect against failures of either device.

Accordingly, preferred embodiments of the present invention provide an immediate solution to the problem of attacks against the global DNS infrastructure, a problem which, as described above, has suffered from a long-felt need for a solution, and also has confounded experts, who have been attempting to solve the problem without success for quite some time. In this regard, the present invention is designed to provide an important level of security and overall protection to recursive DNS servers that routinely submit queries to authoritative DNS servers in the expectation of a true and correct answer to such queries. Further, the present invention effectively and robustly satisfies the industry need for such security during the significant interval of deployment and implementation of DNSSEC.

Figure 1:
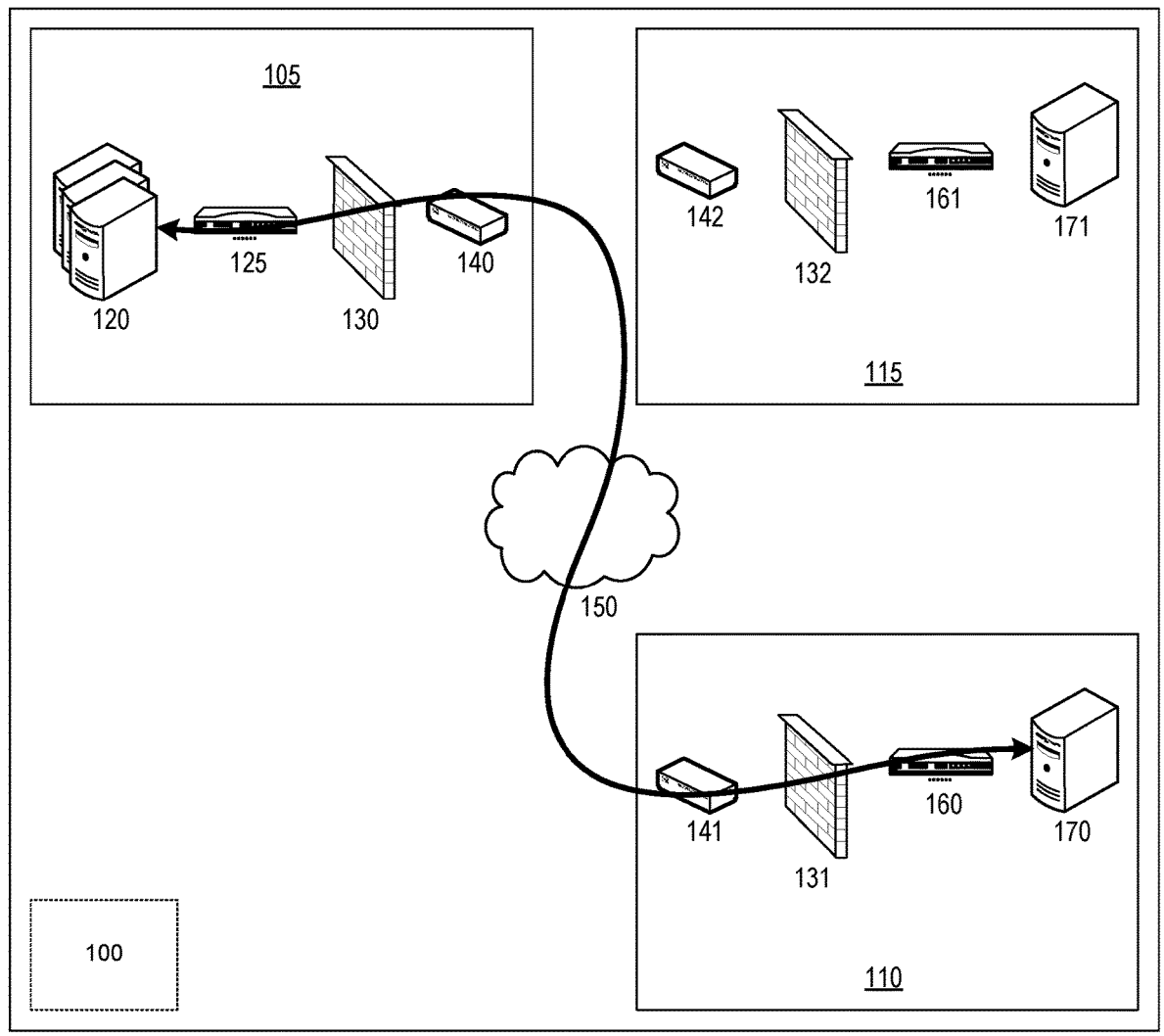
FIG. 1 illustrates a high level architecture of a secure domain name system according to a preferred embodiment of the invention.

Referring to FIG. 1, according to a preferred embodiment of the invention, a secure DNS system 100 comprises two hardware devices, a verifier 125 and a signer 160 or 161, thus providing a "secure path" between the authoritative servers 170, 171 and the recursive resolvers 120 via a network 150, such as the Internet, and firewalls 130, 131, 132 and interfaces 140, 141, 142. The secure path connects the ISP location 105 with primary node 110 and secondary node 115 (the secondary node is used to provide a redundant secure path, as further described below). The secure path utilizes "signing" of all DNS questions destined for the configured DNS providers, as well as "signing" of all authoritative answers sent back to those querying recursive servers 120 to guarantee that the packet is a legitimate answer and not part of an attempted cache poisoning attack. An authentication component or signer 160 or 161 is deployed in front of (i.e., in series with) authoritative DNS servers 170, 171, and a verifier 125 is deployed in front of (i.e., in series with) ISP recursive DNS servers 120. In addition, signers 160, 161 could be deployed in front of other partner DNS provider's authoritative servers.

The signer 160 or 161 and the verifier 125 are purpose-built appliances designed by the present inventors. Both devices reside in line on the network 150 to provide passive packet inspection, such that all DNS traffic to and from authoritative servers 170, 171 and recursive servers 120 passes through each of the devices. This ensures any cache poisoning attack can be identified and dropped upon recognition, while all verified (signed) authoritative answers pass through to the recursive server 120. The signer 160 or 161 is responsible for cryptographically signing all DNS answers requested through known verifiers 125, using shared keys exchanged via a public-key protocol. When a verifier 125 sees a DNS answer from a known anycast prefix (configurable on the devices), the verifier 125 acts on the following conditions:

1. If the DNS answer is unsigned, the verifier 125 drops the packet, as it is deemed to be most likely a spoofed packet.
2. If the DNS answer is signed, but has an invalid signature, the verifier 125 drops the packet, as it is deemed to be most likely a spoofed packet.
3. If the DNS answer is signed, and the signature is valid, the answer is passed through to the recursive server 120.

If the verifier 125 sees a DNS answer from an address other than the known "secure" prefixes (e.g., for a query that the server 170 or 171 is not authoritative for), it simply does nothing, allowing the DNS answer to reach the querying recursive server 125.

The value of this solution is that if an authoritative server 170, 171 has a signer 160, 161 in front of it, and a recursive server 120 has a verifier 125 in front of it, all DNS answers will be cryptographically signed, and thus will only allow valid (authentic) answers to reach the querying recursive server 120.

The key components of a preferred embodiment of the present invention are the authentication component or signer 160 or 161, the verifier 125, and the home base.

The signer 160 or 161 sits inline in front of one or more authoritative DNS servers 170, 171. It monitors all traffic going into and out of the node 110, 115. If the signer 160, 161 sees a signed and encapsulated question, it knows the request came from a verifier 125, and will keep the IP in its in-memory database. When a signer 160, 161 sees an answer destined for a known verifier 125 (based on its in-memory database), the signer 160, 161 generates a cryptographic signature (see the section on the signing engine, described below) and encapsulates the signed packet. The signer 160, 161 then forwards the newly created packet to the recursive server 120, where the verifier 125 is located.

The verifier 125 sits inline in front of one or more recursive servers 120. The verifier 125 must be placed topologically in the path of all client/stub resolver requests and all authoritative server answers. The verifier 125 looks at all DNS traffic coming into and out of the recursive server(s) 120 it sits in front of. If the DNS packet is a question destined for a known authoritative server 170, 171 (or other protected provider; this list is maintained by the home base described below), the verifier 125 signs and encapsulates the outgoing question. This protects the signer 160, 161 from DOS attacks or other malicious behavior. The verifier 125 maintains a list of known, secure source addresses (or anycast prefixes) for the authoritative DNS servers 170, 171. This list is updated automatically so that new authoritative sources can be added easily. When the verifier 125 sees a DNS answer, it checks the source IP of the packet. If it matches a known secure prefix (meaning a signer 160, 161 is in front of the authoritative servers that answered this question), it will check that the packet has a valid signature. It does this by de-encapsulating the packet (see Cryptography Details below) and then checking the embedded signature. If the packet is not encapsulated or has a non-existent or invalid signature, the verifier 125 discards the packet, thereby preventing it from reaching the recursive server 120.

The home base is a web environment that provides the central signaling system for all signers 160, 161 and verifiers 125. It provides a HTTPS interface for all signers 160, 161 and verifiers 125 to use for communication with a secure DNS system according to a preferred embodiment of the present invention. Every verifier 125 and signer 160, 161, at a configurable interval (in a preferred embodiment, 5 minutes), submits a request to the home base system, over HTTPS. The request is authenticated by both the serial number of the device and the current system salt, and is used to retrieve current configuration information and submit health and performance statistics.

Home base functionality currently includes:
Device authentication using a licensing scheme and serial number system;
Periodic updates to the shared secret;
  Updates are configurable but recommended at least once per calendar quarter. No software restarts will be required to take advantage of the new shared secret.
  Devices will effectively have two key intervals to retrieve and use the new shared secret, during which either side will accept signatures based on the new key or the previous key. During an attack, the keys could be changed twice, one immediately after the other, to invalidate all previous keys as quickly as possible.
Updates to the current list of protected networks (for example, anycast prefixes) on a global or per verifier basis
  Updating the list of IP addresses should be infrequent and will require a software restart, which may take a few seconds. (Unsigned) packets will continue to flow through the device during a restart. (Fail open)
Submission of current health and performance information, including:
  Current timestamp of device—this allows the operator to monitor clock skew, which can affect the cryptographic routines (see the section on key exchange and rollover below);
  Current system level statistics such as CPU Load and Memory Utilization;
  Application level counters, including number of DNS questions, number of DNS questions signed, number of DNS answers, number of DNS answers verified, number of DNS answers dropped, etc.

In a preferred embodiment of the present invention, the secure DNS system maintains a steady state with regard to configuration, until changes are made on the home base (e.g., new pre-shared keys, new list of anycast prefixes, etc).

The home base is a critical component of the system. Verifiers 125 and signers 160, 161 are designed to go into bypass (non-verification) mode if they cannot reach the home base for a configurable amount of time. Multiple home base systems will be deployed in an primary/backup configuration, with replication of all changes from the primary to the backup at a minimum interval of five minutes via a scheduled copy of the primary configuration. rsync is utilized to copy the configuration to the secondary, which is imported into the backup server database. In the event the primary fails, all signers 160, 161 and verifiers 125 will switch to polling the backup server until the primary is recovered.

Typical Sunny Day Scenario

Figure 2:
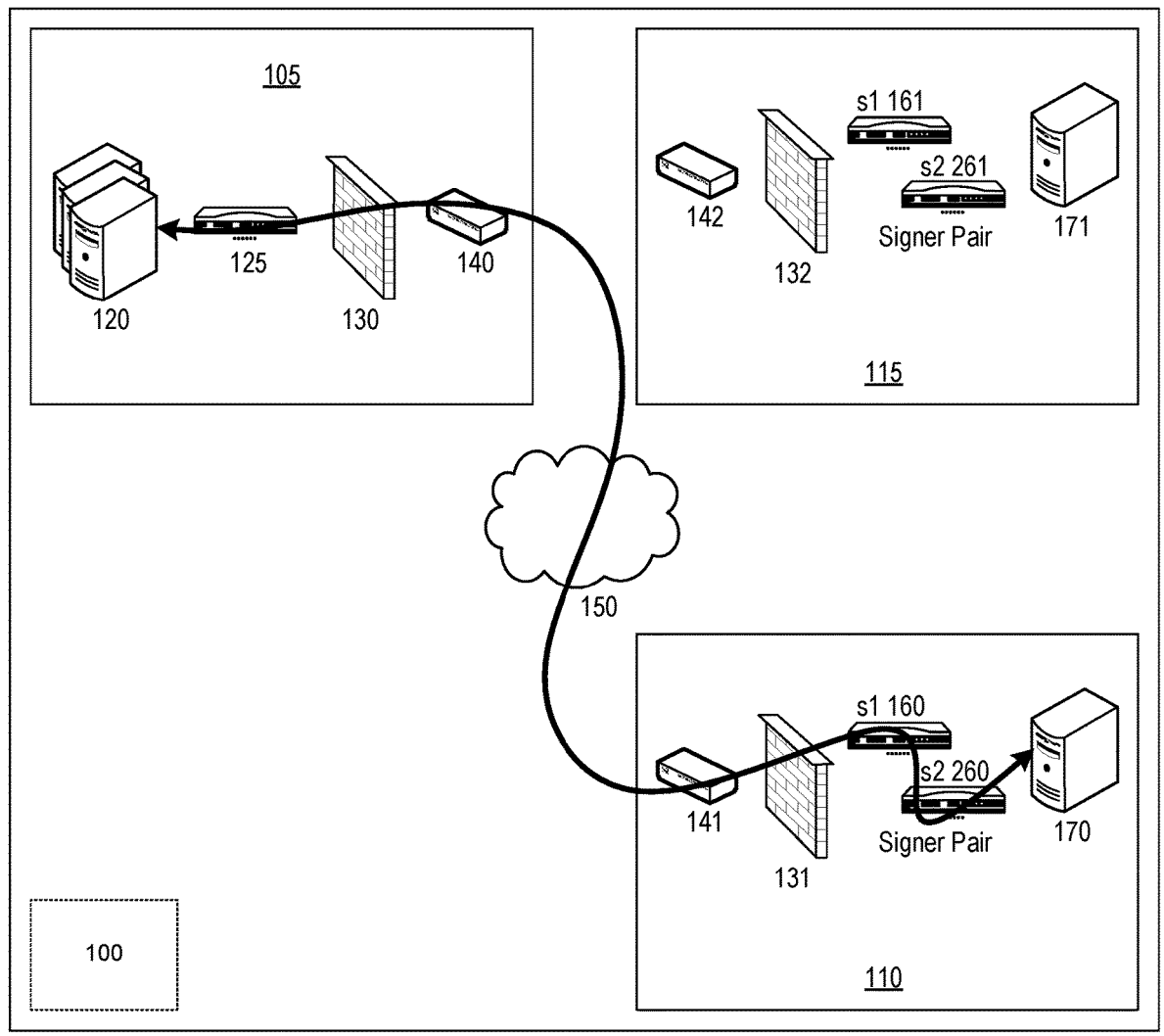
FIG. 2 illustrates an architecture for an exemplary scenario for using a secure domain name system according to a preferred embodiment of the invention.

Referring to FIG. 2, a typical "sunny day" scenario is illustrated. In this scenario, there is no attempt by a malicious party to spoof the secure DNS system 100. Accordingly, this is the simplest scenario. The sequence of events is:

1. The recursive server 120 issues a query to an authoritative server 170.
2. The verifier 125 intercepts the query:
    a. The verifier 125 recognizes that the query is destined to an authoritative server 170 and so the verifier 125 flags the query by encapsulating at Layer 4. The encapsulation takes the original packet IP→UDP→DNS and builds an encapsulated packet IPHeader→UDPHeader→SIG→Payload((DNS)) (see below description of cryptography details).
    b. After encapsulation, the verifier 125 forwards the query to the authoritative server 170 via the network 150.
3. The query is routed (BGP/anycast) to node 115.
4. The signer S1 160 intercepts the query bound for the authoritative server 170.
    a. The query is signed and so the signer S1 160 checks the signature and finds it to be valid.
    b. Signer S1 160 adds the source IP address to its list of recursive servers that are expecting signed responses.
    c. Signer S1 160 removes the signature and passes the query on.
5. The signer S2 260 intercepts the query.
    a. The query is not signed so no signature validation is necessary.
    b. Signer S2 260 passes the query on to the authoritative server 170.
6. The authoritative server 170 responds.
7. The signer S2 260 intercepts the answer bound for the recursive server 120.
    a. Because the destination IP address is not in S2's list of recursive servers 120 that are expecting signed responses, signer S2 260 passes the answer on.
8. The signer S1 160 intercepts the answer bound for the recursive server 120.
    a. Because the destination IP address is in S1's list of recursive servers 120 that are expecting signed responses, and the answer has not been previously signed, signer S1 160 signs the answer and passes it on.
9. The response is routed to the ISP 105 via network 150.
10. The verifier 125 intercepts the answer bound for the recursive server 120.
    a. Because the answer is from an authoritative server 170, the verifier 125 expects a valid signature.
    b. The verifier 125 validates the signature and finds it to be correct.
    c. The verifier 125 strips the signature out of the packet.
    d. The verifier 125 allows the response through to the ISP's recursive server 120.

11. The recursive server 120 receives the response and processes it appropriately.

Thwarting the Malicious Intruder Use Case

Figure 3:
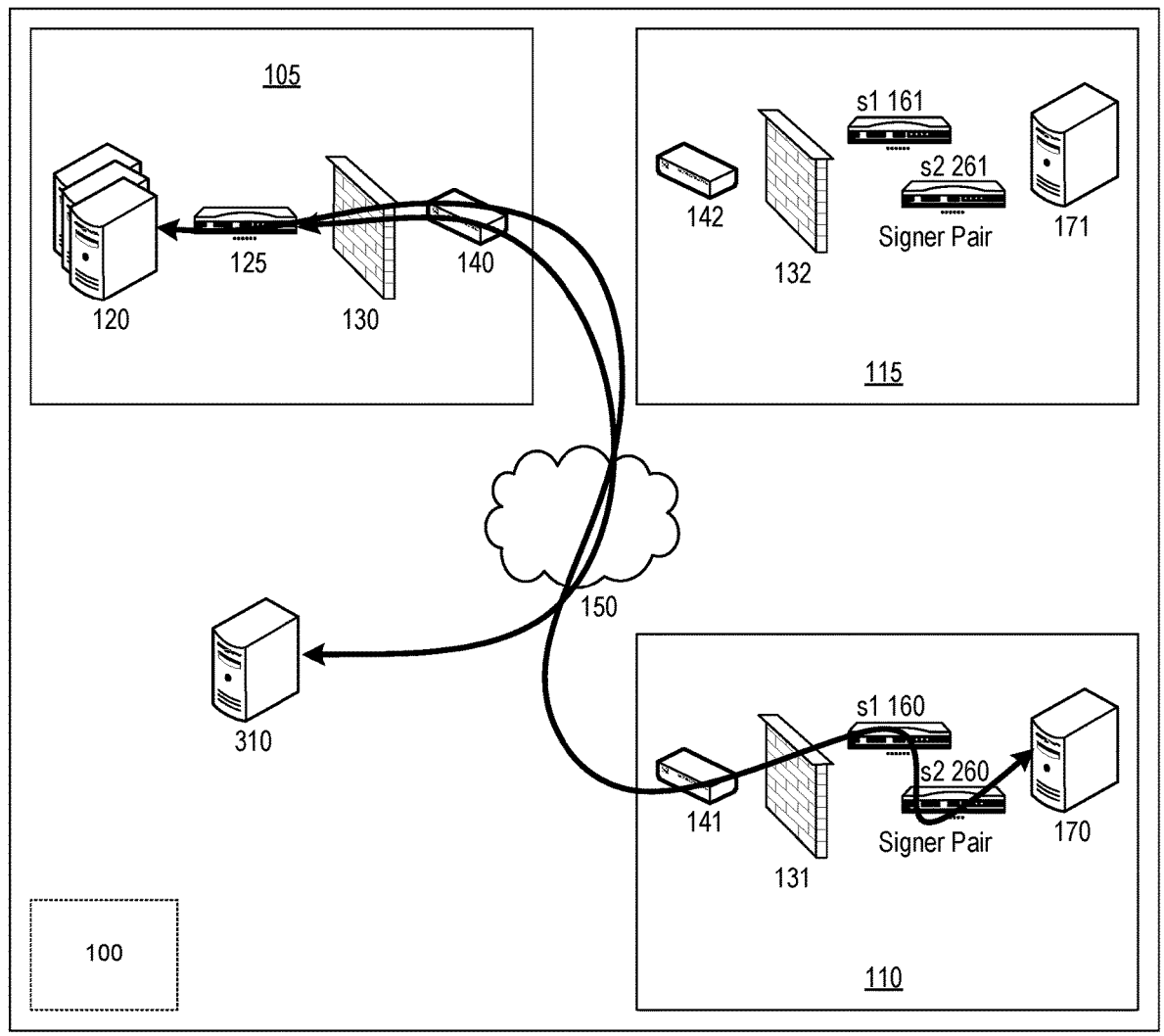
FIG. 3 illustrates an architecture for a second exemplary scenario for using a secure domain name system according to a preferred embodiment of the invention.

Referring to FIG. 3, a malicious intruder case is illustrated. This is the basic scenario that is believed to be responsible for the cache poisoning that is often occurring. A malicious party bombards a recursive server with fake answers, hoping that one of them looks like the real answer. If the exploiter can get his fake response to be accepted before the genuine response is received, the recursive server's cache is poisoned.

The sequence of events is:
1. The recursive server 120 issues a query to an authoritative server 170.
2. The verifier 125 signs the packet and forwards the packet to the authoritative server 170.
3. The query is routed (BGP/anycast) to node 110.
4. A malicious party 310 emulates an authoritative answer, successfully guessing the random data in the query (i.e., builds a response that the recursive server 120 would interpret as genuine).
5. The fake answer is routed to the ISP 105.
6. The verifier 125 intercepts the answer, seeing that it is from an IP address associated with an authoritative server 170, expects a signature.
7. The verifier 125 finds that the signature is missing or incorrect and drops the answer.

In parallel to steps 4 through 7:
8. Signer S1 160 sees that the query is signed, validates the query signature and strips the signature from the query. Signer S1 160 adds the query source IP address to the in-memory list of recursive servers requiring signatures and passes the query on.
9. Signer S2 260 sees that the query is not signed and passes the query on.
10. The authoritative server 170 responds.
11. Signer S2 260 sees that the answer is not destined for an address that is in its list of recursive servers requiring a signature and passes the answer on.
12. Signer S1 160 sees that the answer is destined for an address that is in its list of recursive servers requiring a signature. Since the answer is not signed, signer S1 160 signs the answer and passes it on.
13. The answer is routed to the ISP 105 via network 150.
14. The verifier 125 intercepts the answer, sees that it is from an IP address associated with authoritative server 170, and expects a signature.
15. The verifier 125 verifies the signature (i.e., everything is okay).
16. The verifier 125 allows the genuine answer through to the ISP's recursive server 120.

Query Use Case with No Signer

Figure 4:
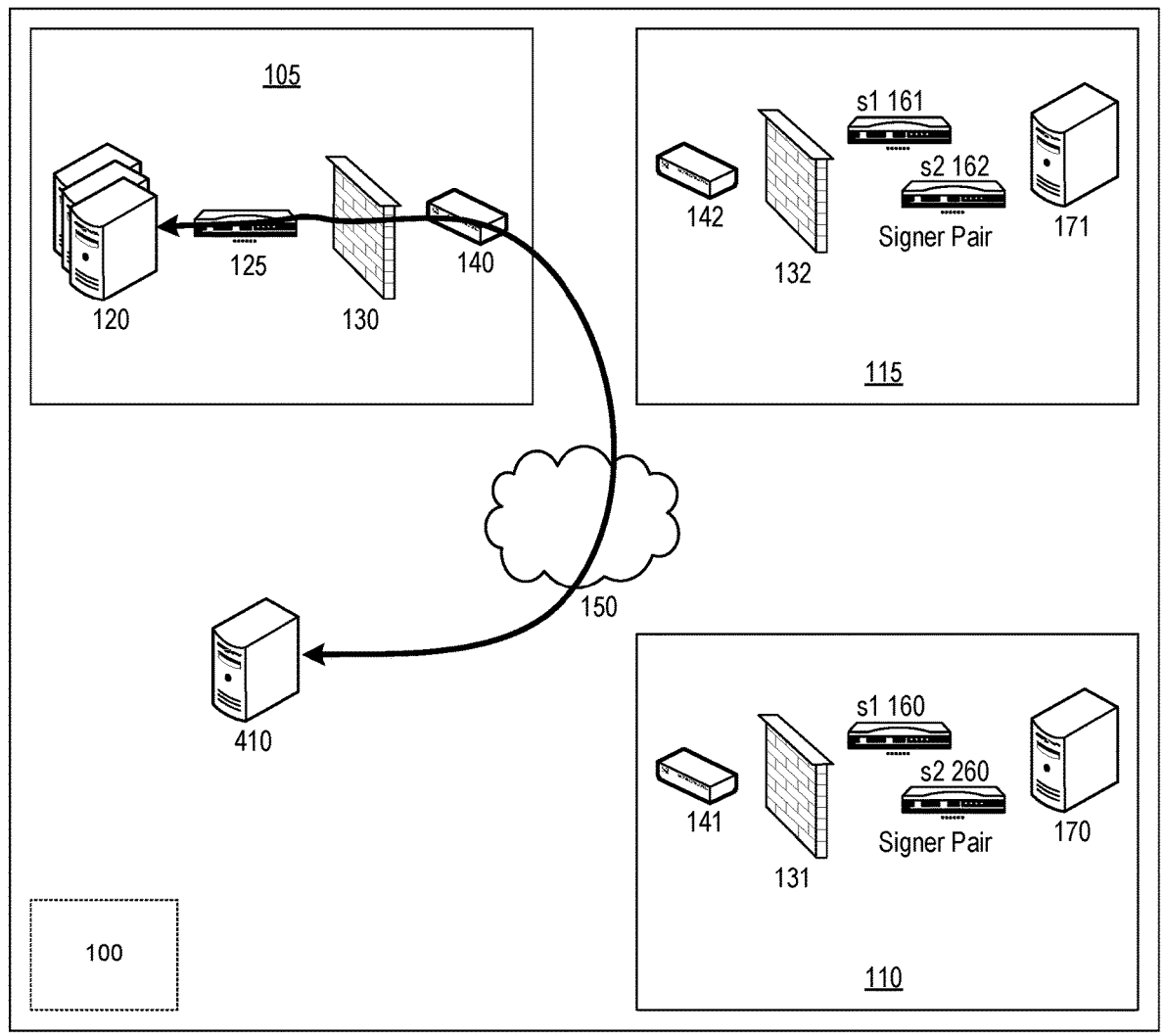
FIG. 4 illustrates an architecture for a third exemplary scenario for using a secure domain name system according to a preferred embodiment of the invention.

Referring to FIG. 4, this scenario covers the case where an authoritative name server 410 is not connected to an authentication component or signer 160, 161. The query is processed correctly but there is no protection against a cache poisoning attack.

The sequence of events is:
1. The recursive server 120 issues a query to an authoritative server 410 which is not connected to an authentication component 160, 161.
2. The verifier 125 sees that the packet is destined for an address which does not appear in the list of signed servers 170, 171 and so it passes the packet through untouched.
3. The query is routed to the appropriate authoritative server 410.
4. The server 410 responds.
5. The verifier 125 does not intercept the answer as the source IP address of the answer is not that of a known signed server.
6. The ISP's recursive server 120 receives the unprotected response.

Verifier is Down

In an alternative embodiment, the verifier 125 will fail closed (meaning it will just pass all traffic through). The DNS queries will not be signed by the verifier 125, so there will be no request to the signer 160 to sign the response. Because there is no way to reliably inform the signer 160 that the verifier 125 is going down, an alternate logic path may be implemented: Every time a verifier 125 sends a signed request to a signer 160, the signer 160 notes that the verifier 125 is active and updates it in a memory list of active verifiers 125. When a signed query has not been received from any given verifier 125 for two or three seconds (configurable), the signer 160 removes that verifier 125 from its list of active verifiers. This leaves two use-cases as described below.

Verifier is Down; Signer Still Sees Verifier as Active

Figure 5:
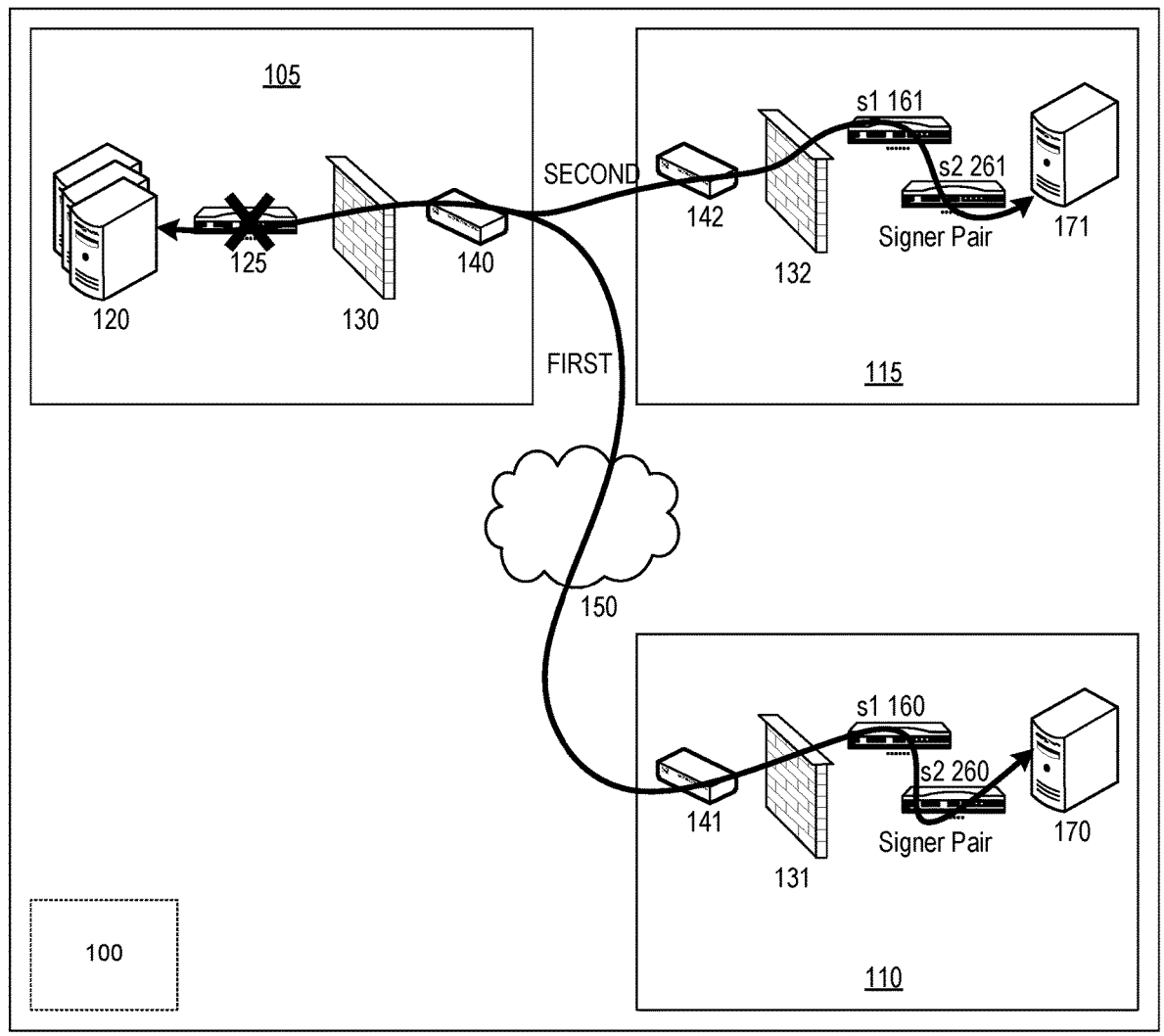
FIG. 5 illustrates an architecture for a fourth exemplary scenario for using a secure domain name system according to a preferred embodiment of the invention.

Referring to FIG. 5, when the verifier 125 goes down, it has no reliable way to communicate its status change to the signer 160. Consequently, for a few seconds after the verifier 125 goes down, the signer 160 will still operate as though the verifier 125 is operational. The retry mechanism in the recursive DNS server 120 must be relied upon to resend the request to a different authoritative server 171.

The sequence of events is:
1. The recursive server 120 issues a query to an authoritative server 170.
2. The verifier 125 is down and so does not sign the query.
3. The query is routed (BGP/anycast) to node 110.
4. Signer S1 160 sees that the query is not signed and passes the query on.
5. Signer S2 260 sees that the query is not signed and passes the query on.
6. The authoritative server 170 responds.
7. Signer S2 260 sees that the answer is not destined for an address that is in its list of recursive servers requiring a signature and passes the answer on.
8. Signer S1 160 sees that the answer is destined for an address that is in its list of recursive servers (i.e., has not timed out yet from the in memory database) requiring a signature. Because the answer is not signed, signer S1 160 signs the answer and passes it on.
9. The answer is routed to the ISP 105.
10. The verifier 125 is down and so the answer is passed through to the recursive server 120. Unfortunately, the recursive server 120 cannot handle the packet and will drop it—the signature makes the packet appear to be an invalid DNS response.

After a few seconds:
11. The recursive server 120 times out waiting for a response and sends a second request, this time to a different authoritative server 171. This retransmission scenario may be routed to a different node, e.g., node 115. It is possible, depending on the timeout period and other factors, that the recursive server 120 will in fact retry more than once.
12. The verifier 125 is down and so does not sign the query.
13. The query is routed (BGP/anycast) to node 115, which has not seen this verifier 125 in the timeout period before, and will not have the IP in its tracking database.

14. Signer S1 161 sees that the query is not signed and passes the query on.
15. Signer S2 261 sees that the query is not signed and passes the query on.
16. The authoritative server 171 responds.
17. Signer S2 261 sees that the answer is not destined for an address that is in its list of recursive servers requiring a signature and passes the answer on.
18. Signer S1 161 sees that the answer is not destined for an address that is in its list of recursive servers requiring a signature and passes the answer on.
19. The answer is returned to the querying recursive server 120 and verifier 125.
20. Because the verifier 125 is down, it will not intercept the answer.
21. The unprotected answer is passed to the recursive server 120 for processing.

Verifier is Down; Signer Sees Verifier as Down

Figure 6:
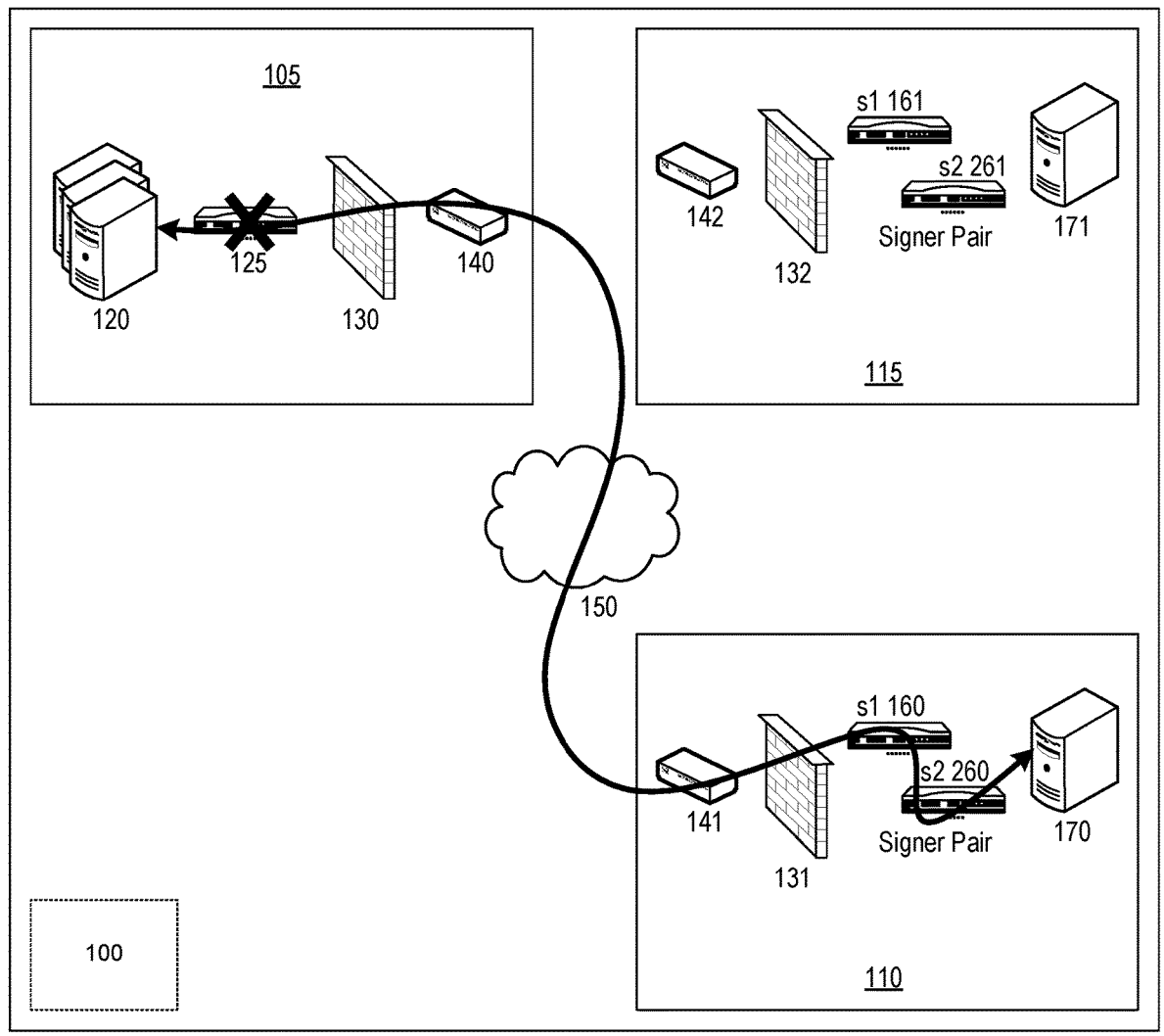
FIG. 6 illustrates an architecture for a fifth exemplary scenario for using a secure domain name system according to a preferred embodiment of the invention.

Referring to FIG. 6, this use case describes the simpler case where the verifier 125 has been down for a few seconds and each signer 160, 161, 260, 261 has removed the verifier 125 from its list of active verifiers.

The sequence of events is:
1. The recursive server 120 issues a query to an authoritative server 170.
2. The verifier 125 is down and so does not sign the query.
3. The query is routed (BGP/anycast) to node 110.
4. Signer S1 160 sees that the query is not signed and passes the query on.
5. Signer S2 260 sees that the query is not signed and passes the query on.
6. The authoritative server 170 responds.
7. Signer S2 260 sees that the answer is not destined for an address that is in its list of recursive servers requiring a signature and passes the answer on.
8. Signer S1 160 sees that the answer is not destined for an address that is in its list of recursive servers requiring a signature and passes the answer on.
9. The answer is routed to the ISP 105.
10. The verifier 125 is down and so the answer is passed through to the recursive server 120.
11. The recursive server 120 processes the unprotected response.
12. There is a time period, T, between when a packet leaves a failed verifier 125 and when the verifier 125 recovers. Packets sent during time T will not been signed and will be dropped. A retry will be forced, at which time the full transaction will succeed.

Signer Device Failures

The authentication components, or signers 160, 161, 260, 261, are deployed as redundant in-line pairs, which minimizes the impact if either box experiences a failure. Generally, the outer-most signer (S1) is the device that handles the query signature verification and answer signing with the inner device (S2) being a simple pass through.

If the S1 device fails, the S2 device takes on the query signature verification and answer signing responsibilities. The interesting use cases, however, are related to what happens in the few seconds after S1 fails and in the few seconds after S1 is recovered.

Signer S1 is Down; Signer S2 is Carrying the Load

Figure 7:
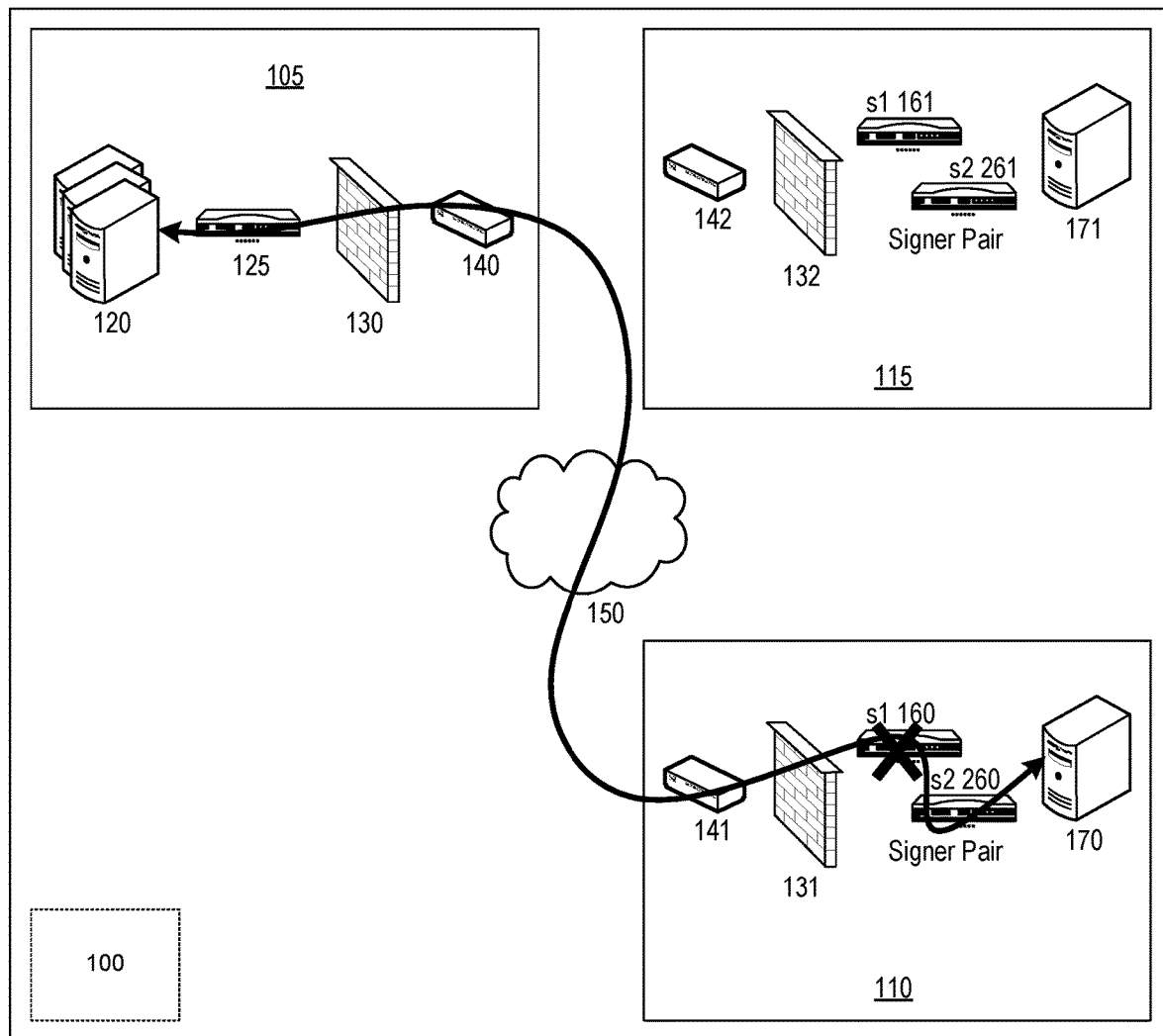
FIG. 7 illustrates an architecture for a sixth exemplary scenario for using a secure domain name system according to a preferred embodiment of the invention.

Referring to FIG. 7, this scenario is a fairly simple case. Signer S1 160 has gone down and signer S2 260 is processing the load.

The sequence of events is:
1. The recursive server 120 issues a query to an authoritative server 170.
2. The verifier 125 signs the packet and forwards the packet to the authoritative server 170.
3. The query is routed (BGP/anycast) to node 110.
4. Signer S1 160 is down and so the packet passes through.
5. Signer S2 260 sees that the query is signed, validates the query signature and strips the signature from the query. Signer S2 260 adds the query source IP address to the in-memory list of recursive servers requiring signatures and passes the query on.
6. The authoritative server 170 responds.
7. Signer S2 260 sees that the answer is destined for an address that is in its list of recursive servers requiring a signature, that it is signed, and passes the answer on.
8. Signer S1 160 is down and so the packet passes through.
9. The answer is routed to the ISP 105.
10. The verifier 125 intercepts the answer, sees that it is from an IP address associated with an authoritative server 170, and expects a signature.
11. The verifier 125 verifies the signature (i.e., everything is okay).
12. The verifier 125 allows the answer through to the ISP's recursive server 120.

Signer S2 is Down; Signer S1 is Carrying the Load

Figure 8:
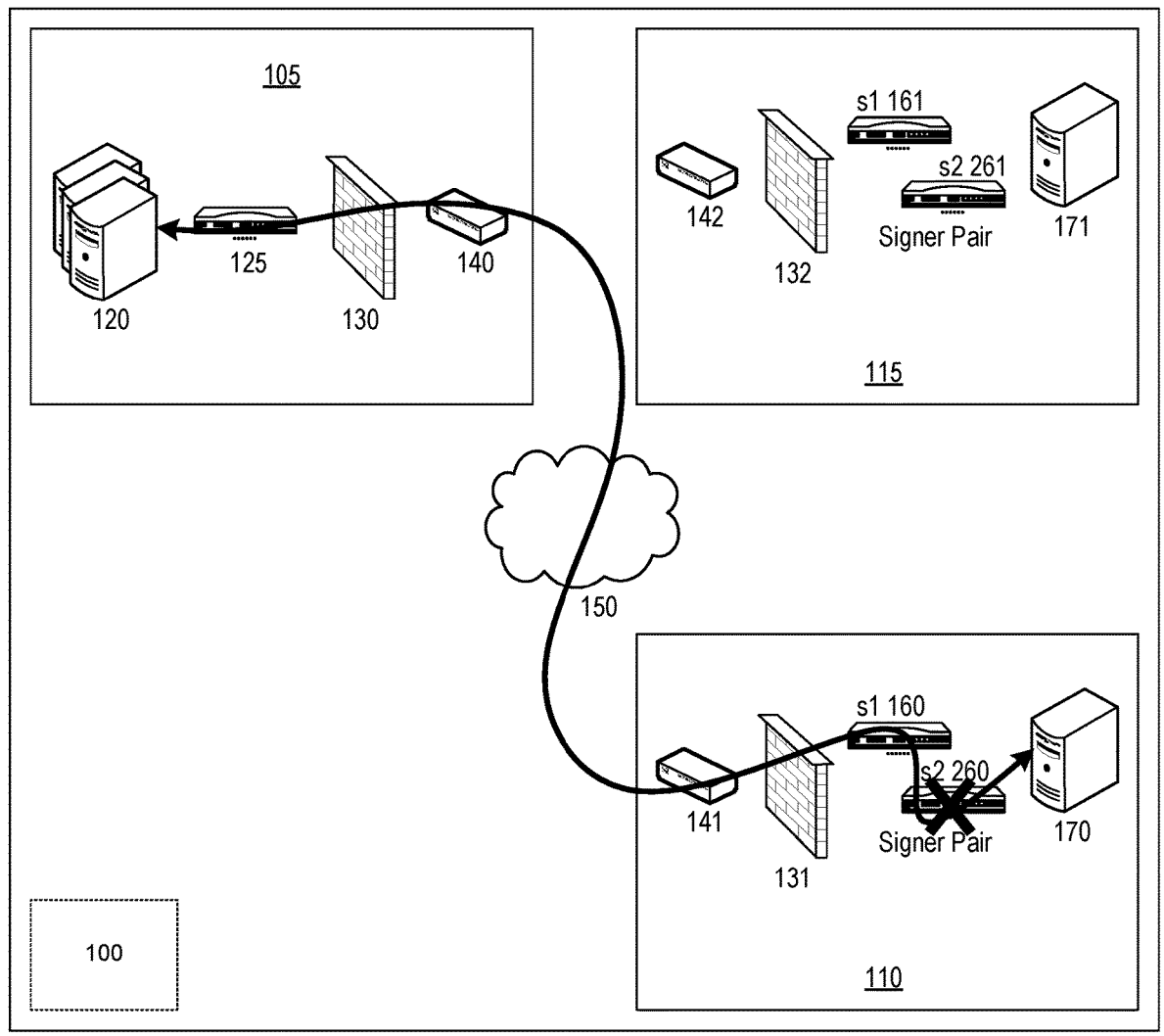
FIG. 8 illustrates an architecture for a seventh exemplary scenario for using a secure domain name system according to a preferred embodiment of the invention.

Referring to FIG. 8, this scenario is a trivial case. Signer S2 260 (i.e., the backup) has gone down and signer S1 160 continues to process. The sequence of steps is not spelled out for this case. The sequence is the same as the sequence for the Sunny Day Scenario (described above), except that signer S2 260 is passing through the packets because it is down and not because it sees that no work is required.

Signer S1 Goes Down with Outstanding Queries

Figure 9:
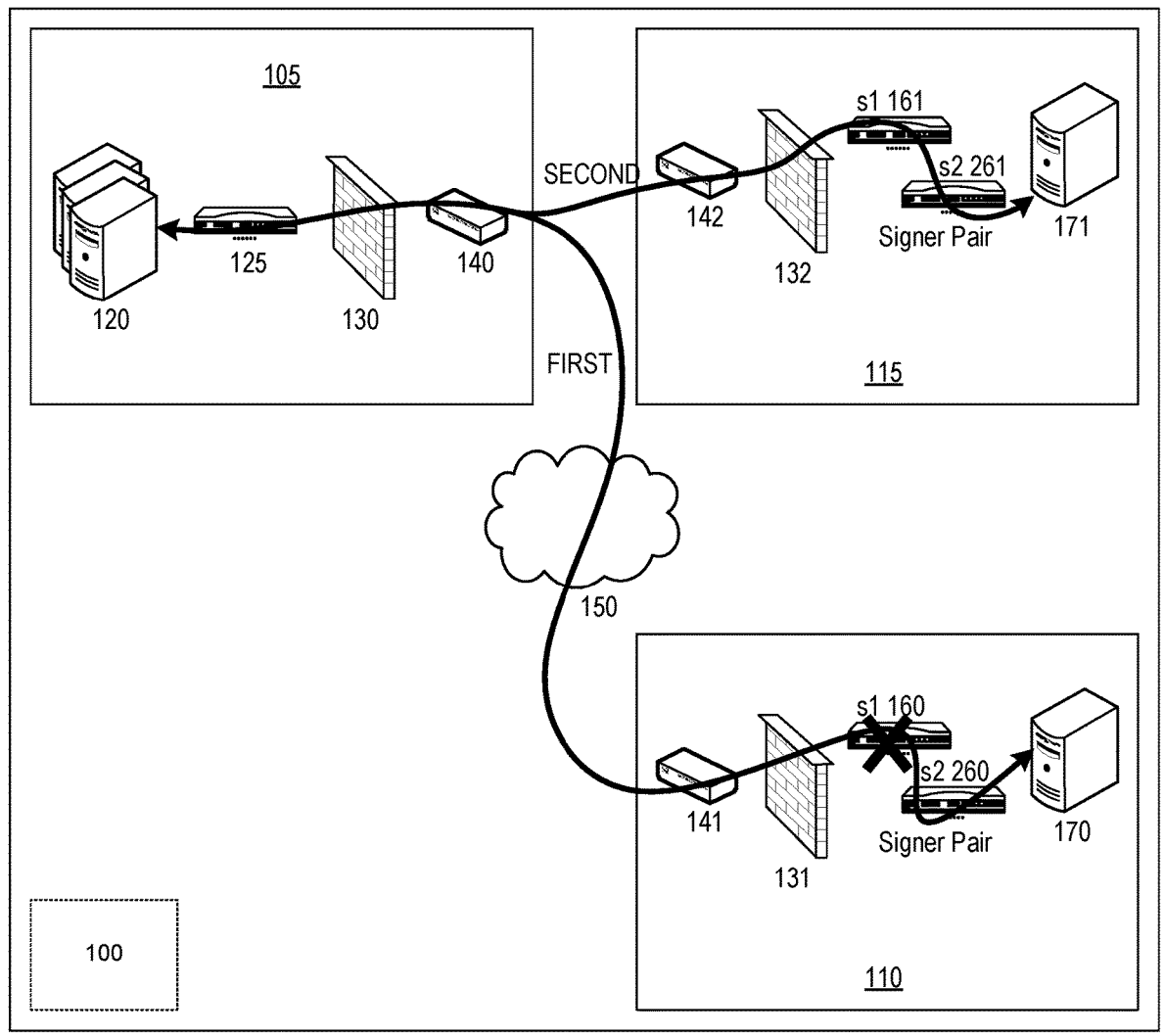
FIG. 9 illustrates an architecture for a eighth exemplary scenario for using a secure domain name system according to a preferred embodiment of the invention.

Referring to FIG. 9, this use case describes what happens to queries that are in progress when signer S1 160 goes down. In this case the retry mechanism in the recursive server is relied upon to make a second query.

The sequence of events is:
1. The recursive server 120 issues a query to an authoritative server 170.
2. The verifier 125 sees the query is destined to an authoritative server 170 and so signs the query and passes it on.
3. Signer S1 160 sees that the query is signed, validates the query signature and strips the signature from the query. Signer S1 160 adds the query source IP address to the in-memory list of recursive servers requiring signatures and passes the query on.
4. Signer S2 260 sees that the query is not signed and passes the query on.
5. Signer S1 160 goes down.
6. The authoritative server 170 responds.
7. Signer S2 260 sees that the answer is not destined for an address that is in its list of recursive servers requiring a signature and passes the answer on.
8. Signer S1 160 is down and so the unsigned answer passes through.
9. The answer is routed to the ISP 105.
10. The verifier 125 intercepts the answer, sees that it is from an IP address associated with an authoritative server 170, and expects a signature.
11. Because the answer is not signed, the verifier 125 drops the answer believing it to be malicious.

After a few seconds:
12. The recursive server 120 times out waiting for a response and sends a second request, this time to a different authoritative server 171. This query may be routed to a different node 115.

The scenario continues as a sunny day scenario with the request handled by node 115.

Signer S1 is Recovered

Figure 10:
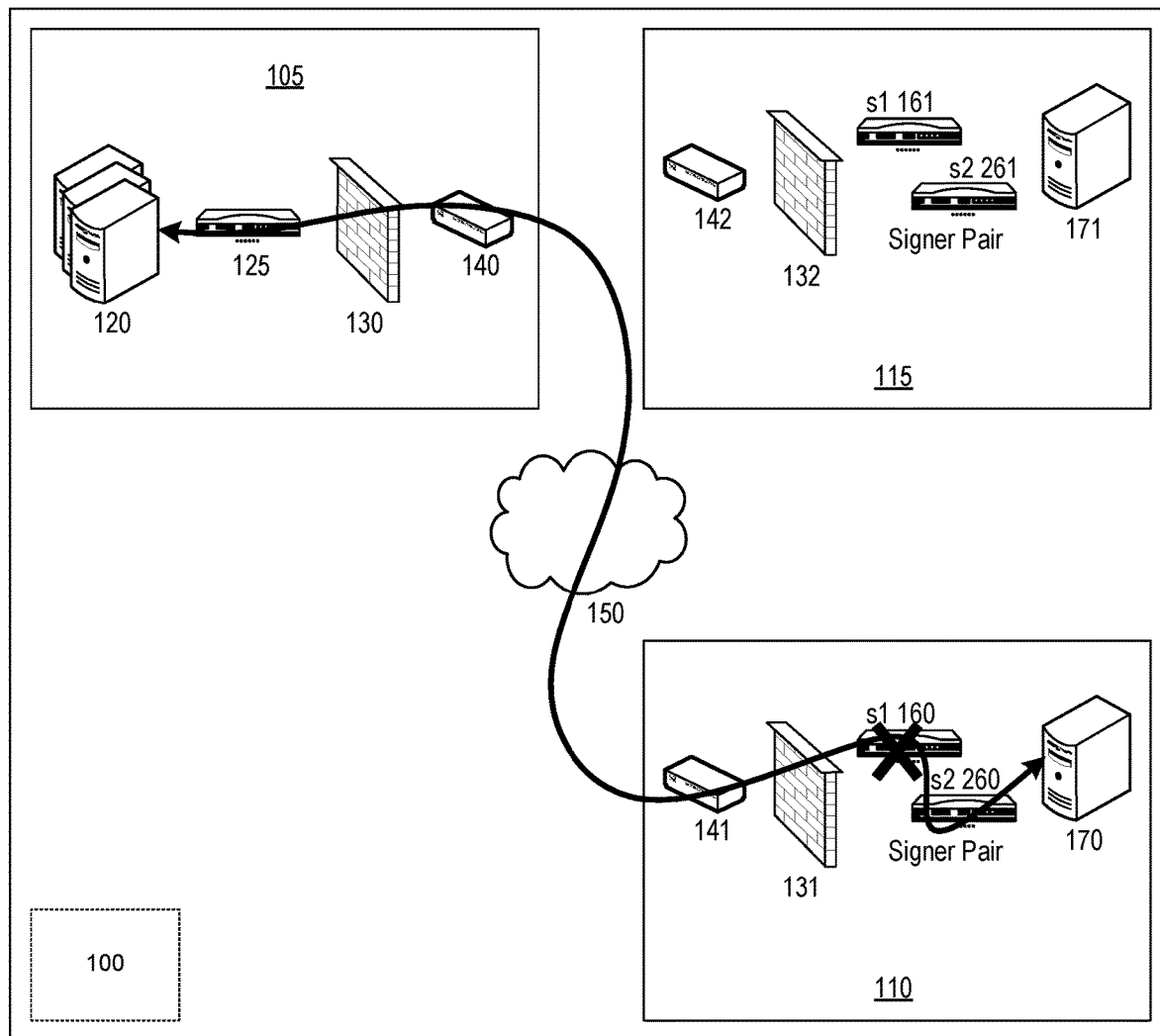
FIG. 10 illustrates an architecture for a ninth exemplary scenario for using a secure domain name system according to a preferred embodiment of the invention.

Referring to FIG. 10, this describes the case where signer S1 160 is recovered while queries are outstanding at the authoritative server.

The sequence of events is:
1. The recursive server 120 issues a query to an authoritative server 170.
2. The verifier 125 sees the query is destined to an authoritative server 170 and so signs the query and passes it on.
3. Signer S1 160 is down and so the query passes through.
4. Signer S2 260 sees that the query is signed, validates the query signature and strips the signature from the query. Signer S2 260 adds the query source IP address to the in-memory list of recursive servers requiring signatures and passes the query on.
5. Signer S1 160 is recovered.
6. The recursive server 120 issues one or more unrelated queries to the same authoritative server 170.
   a. Signer S1 160 processes these queries.
   b. Signer S1 160 adds the source IP address of the queries to the in-memory list of recursive servers requiring signatures.
7. The authoritative server 170 responds.
8. Signer S2 260 sees that the answer is destined for an address that is in its list of recursive servers requiring a signature, signs the signature and passes the answer on.
9. Signer S1 160 sees that the answer is destined for an address that is in its list of recursive servers requiring a signature, but it sees that the answer is already signed so it does not sign the answer again. It is noted that it is permissible for signer S1 160 to re-sign the answer, thereby removing the signature that was already in place.
10. The answer is routed to the ISP 105.
11. The verifier 125 intercepts the answer, sees that it is from an IP address associated with an authoritative server 170, and expects a signature. The signature is found to be valid and the answer is passed on.
12. The recursive server 120 processes the secured response.

Non-Participating ISP

Figure 11:
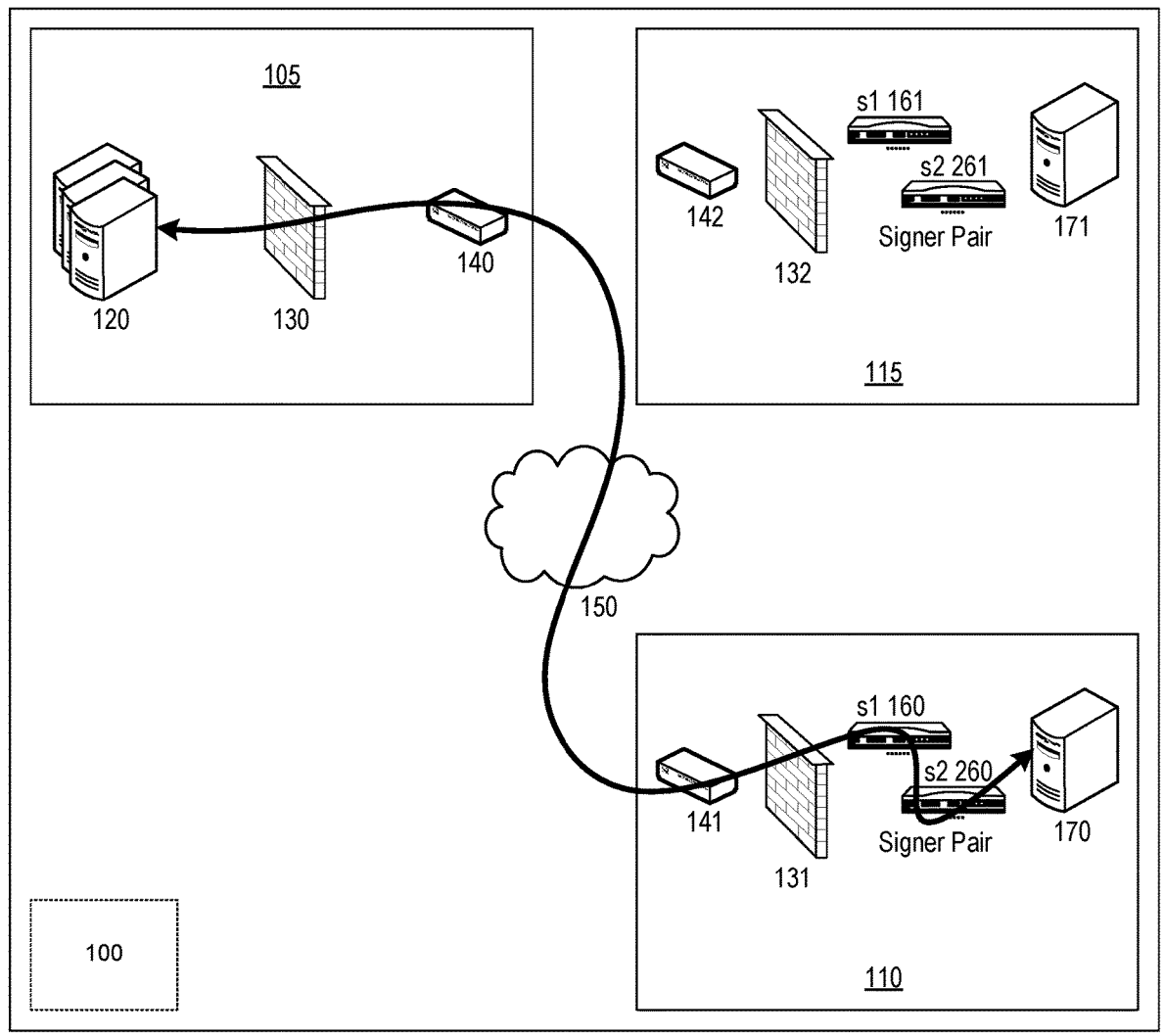
FIG. 11 illustrates an architecture for a tenth exemplary scenario for using a secure domain name system according to a preferred embodiment of the invention.

Referring to FIG. 11, some ISPs will choose not to participate in a secure DNS system according to the present invention. This use-case shows that their service will be unaffected.

The sequence of events is:
1. The recursive server 120 issues a query to an authoritative server 170.
2. The query is routed (BGP/anycast) to node 110.
3. Signer S1 160 sees that the query is not signed and passes the query on.
4. Signer S2 260 sees that the query is not signed and passes the query on.
5. The authoritative server 170 responds.
6. Signer S2 260 sees that the answer is not destined for an address that is in its list of recursive servers requiring a signature and passes the answer on.
7. Signer S1 160 sees that the answer is not destined for an address that is in its list of recursive servers requiring a signature and passes the answer on.
8. The answer is routed to the ISP 105.
9. The unprotected answer is received by the ISP's recursive server 120.

Cryptography Details

This section describes the essential aspects of the cryptography operations—exchanging keys, signing and verifying, and key rollover.

Signature Algorithm and Details

In a preferred embodiment of the invention, both questions and answers are signed for authentication purposes. Signature data is inserted in the following manner:

$$\text{Ethernet} \rightarrow \text{IP\_Hdr} \rightarrow \text{L4\_Hdr} \rightarrow \text{SIG} \rightarrow \text{L4\_Payload}$$

Encapsulation details:
  The L4 payload is a replica of the original.
  Ethernet, IP, and L4 headers remain largely unchanged, however:
    If fragmentation is required, fragmentation is based on a 1500 byte MTU.
    If packets are fragmented, reassembly occurs automatically upon receipt.
    Lengths are modified accordingly,
    Checksums are recalculated accordingly.

Signature details:
  The signature is a HMAC (or portion thereof) based on:
    A shared secret (described below)
    The entire L4 payload
    The source IP address
    A timestamp (if possible)
    A salt (if possible, as a policy-configurable option)
      The salt is not automatically updated
  The signature portion is designed, in part, so that a standard DNS parser such as a resolver does not incorrectly identify it as a legitimate DNS packet. If the DNS packet looks like a legitimate DNS packet, a recursive server 120 may use the answer from the packet, even though it would be garbled, thus providing an incorrect answer. It is far worse to provide an incorrect answer, than no answer at all.
  A 128-bit hash (or larger if possible) is used. However, the exact mechanism to be used depends largely on performance characteristics.
  A web-based mechanism (intended to run on a central web server) is provided to allow the devices to "phone home" at a configurable frequency.

Key Exchange/ROLLOVER

In a preferred embodiment of the invention, a secure DNS system has two system-wide, shared secret keys that are valid at any given time, called Kcurrent and Kprevious. When the devices check in to the home base over the secure channel, they receive updated keys (if any) in addition to the list of UltraDNS anycast prefixes. All messages are signed with both keys, and considered valid if either signature is valid. When a device activates a new key from the home base, that key becomes Kcurrent, and the old Kcurrent becomes Kprevious. This works as long as key distribution time (i.e., time between the first and the last host getting the new key) is less than key lifetime. Key rollover time is configurable, but will likely be done at least once per calendar quarter. During an attack, the keys could be changed twice, one immediately after the other, to invalidate all previous keys as quickly as possible. No software restarts will be required to take advantage of the new secret.

To safeguard against key retrieval failures, the key management system will begin staggered attempts to retrieve the new key k+1 as soon as k is made active. Each key is retrieved with its corresponding activation time (Tk+1), which is one key lifetime in the future from activation time Tk of k. When activation time for k+1 arrives, it will become current key on all nodes. This method ensures the unstable "dual key" period is relatively short compared to key lifetime, as well as provides ample time for the key management system to obtain the new key and recover from any problems (other than perhaps persistent network failures).

Heartbeat Mechanism

In one embodiment of the invention, an active heartbeat mechanism is not used. A signer 160 knows a verifier 125 is up by the fact that it sees flagged (signed and encapsulated) queries from a working verifier 125. If the signer 160 sees a flagged (encapsulated and signed) query come from a particular ISP recursive server 120, the signer 160 knows that specific IP is being protected by a verifier 125, and knows to sign the answer. If the verifier 125 is down, the packet will not be flagged, so the signer 160 will not sign the answer on the way back. If a signer 160 is down, the verifier 125 would be sending invalid packets to the authoritative server, which is a big problem as this would cause packets to be dropped. To protect against this, the signer 160 is set in a "high availability mode", described below.

High Availability

Figure 12:
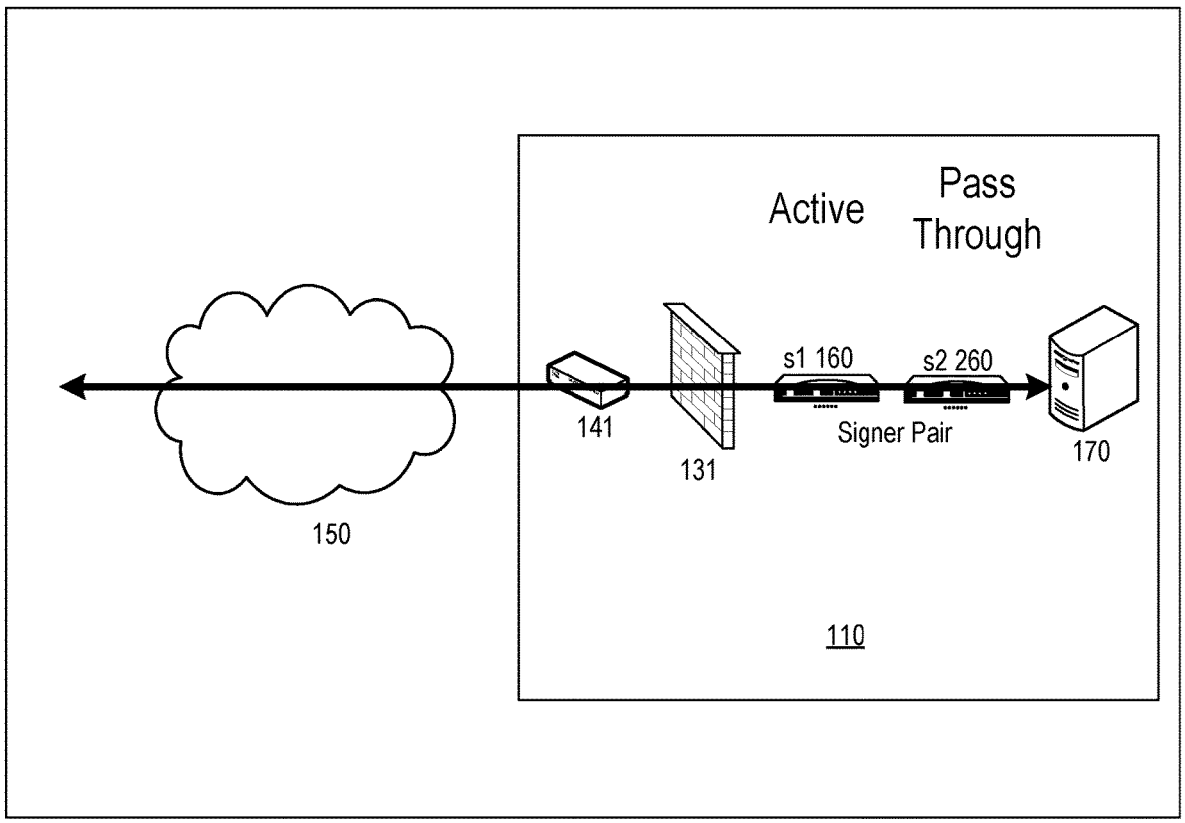
FIG. 12 illustrates an architecture for an exemplary scenario for using a redundant signer component in a secure domain name system according to a preferred embodiment of the invention.
Figure 13:
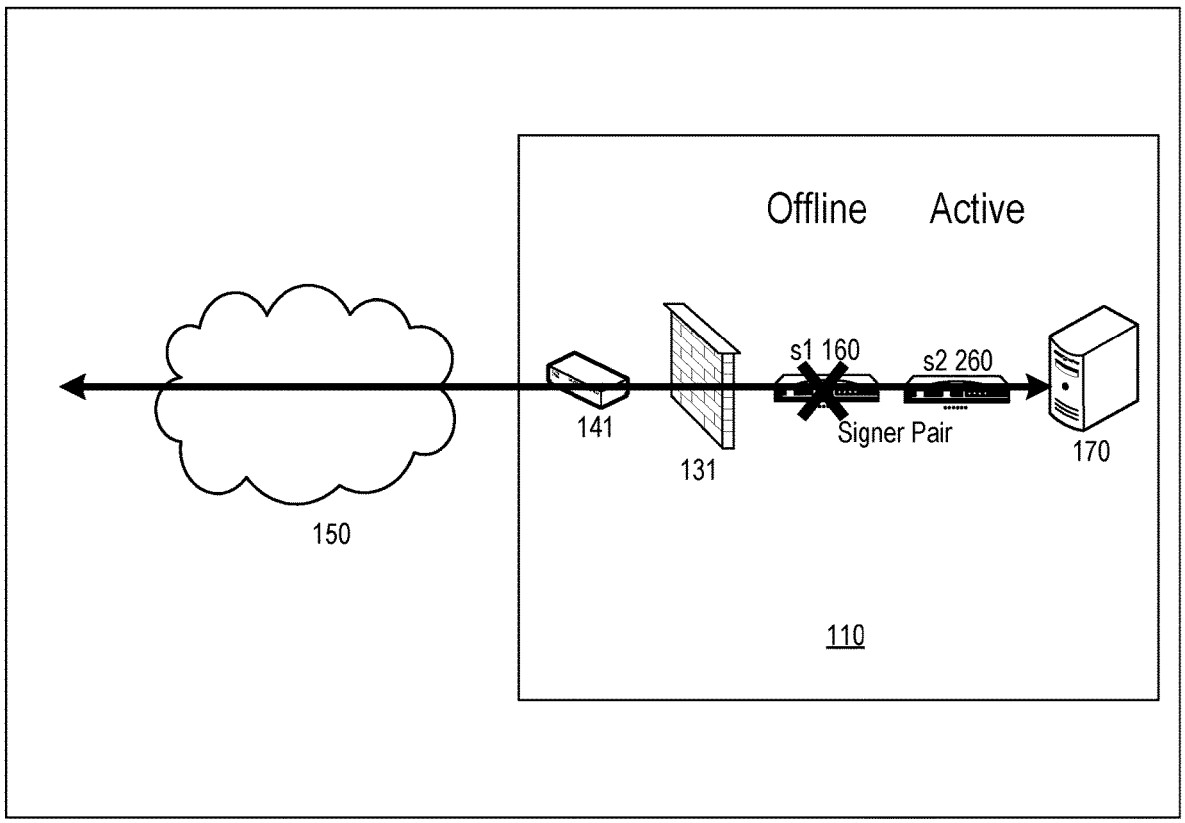
FIG. 13 illustrates an architecture for a second exemplary scenario for using a redundant signer component in a secure domain name system according to a preferred embodiment of the invention.

Referring to FIGS. 12 and 13, the availability of the signer 160 is critical In the functioning of the service. To maintain a highly available service, the signers 160, 260 will be put in a serial mode in-line with each other.

Referring to FIG. 12, signer S1 160 performs all encapsulation/de-encapsulation of the questions and answers, and signer S2 260 will only see normal traffic pass though (i.e., signer S2 260 does not need to sign any answers, because it will not see any actual verifier-encapsulated traffic). Referring to FIG. 13, if signer S1 160 fails, signer S2 260 then sees all traffic coming in from the verifiers 125, and will begin to keep track of all known verifiers 125, and sign all answers destined to those identified verifiers 125.

Housekeeping Details

This section deals with housekeeping functions—i.e., keeping the devices up to date from a software and configuration perspective.

Verifier Checks in

Figure 14:
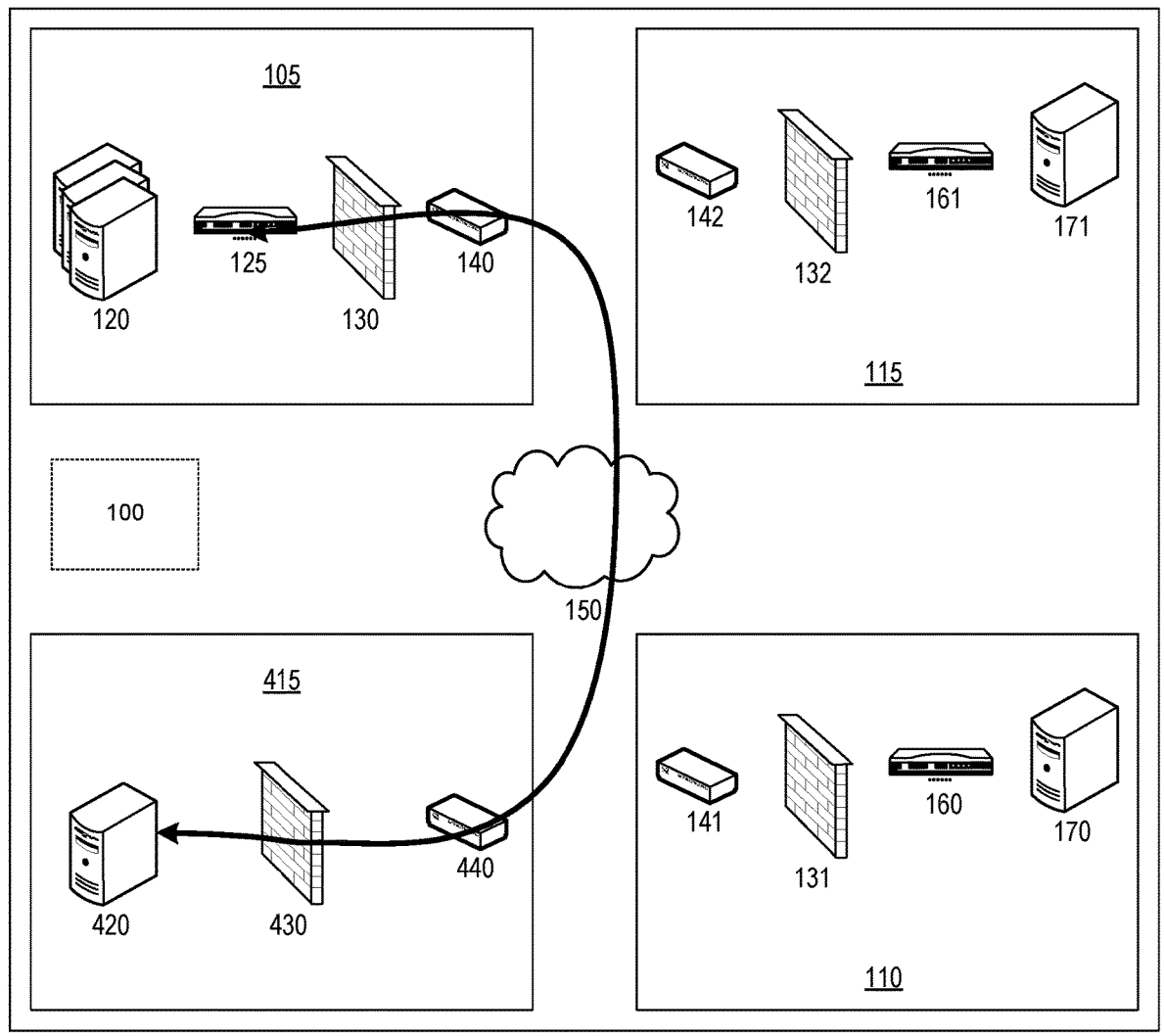
FIG. 14 illustrates an architecture for an exemplary scenario for maintaining software and configuration of a secure domain name system according to a preferred embodiment of the invention.

Referring to FIG. 14, the verifier 125 checks in to the home base 415 periodically to get lists of anycast prefixes, and the shared keys that are needed to validate the signatures.

Figure 15:
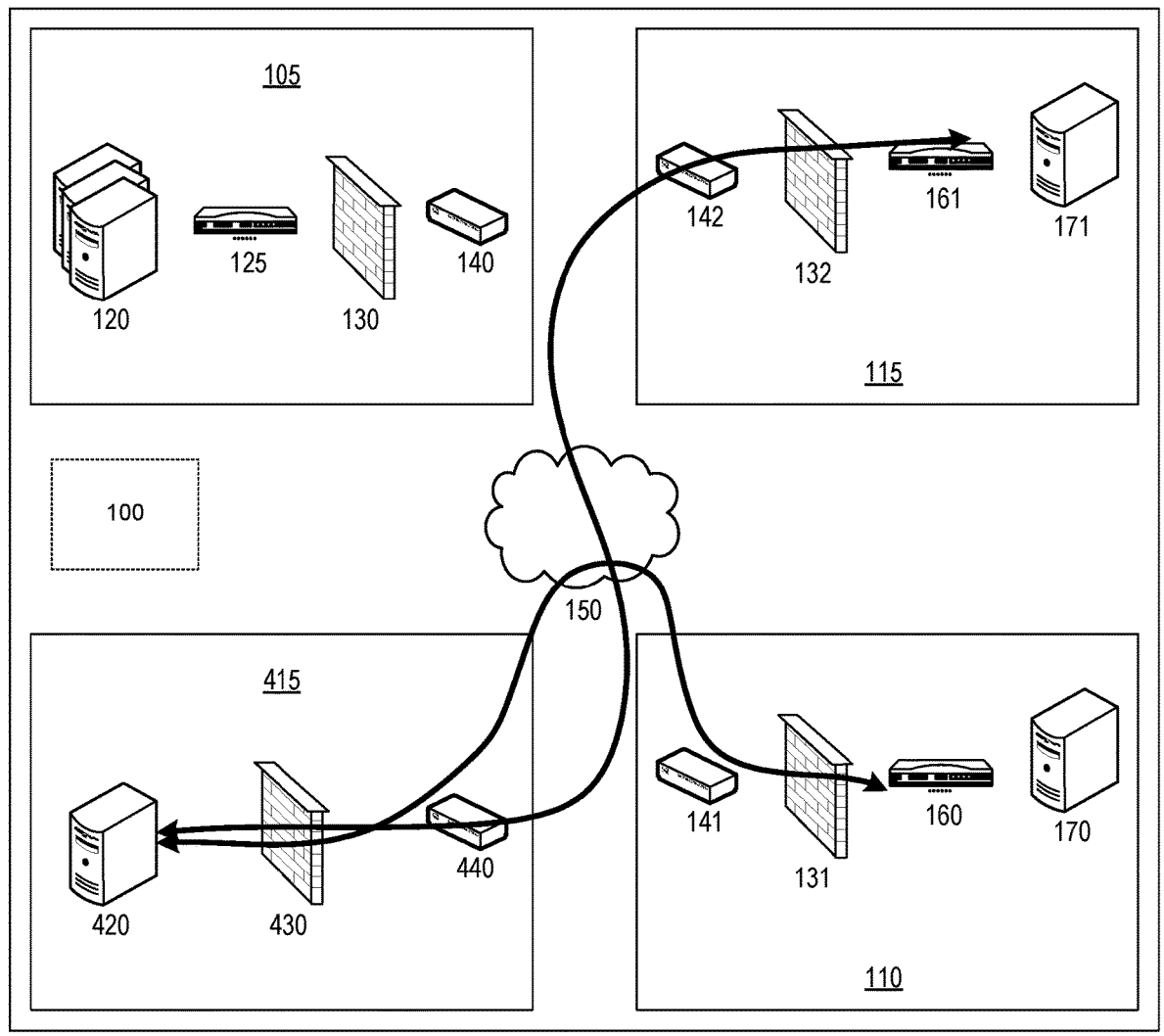
FIG. 15 illustrates an architecture for a second exemplary scenario for maintaining software and configuration of a secure domain name system according to a preferred embodiment of the invention.

The sequence of events is:
1. Verifier 125 makes a TCP connection to home base 415 on a pre-determined port, via HTTPS, which provides a secure and encrypted path (assumption is made that the ISP 105 has the selected port open, which should be part of the pre-deployment checklist of requirements).
2. This connection does not impact the signing logic, which continues on a separate execution path.
3. Configuration server 420 updates the verifier 125:
   a. If a firmware update is available, new firmware is downloaded, device goes into maintenance/bypass mode, and restarts with new firmware.
   b. Current key (if there is a new key, the Verifier makes the current key Kprevious, and the new key Kcurrent—see the section on key exchange and rollover, described above, for more information).
   c. Current list of anycast prefixes.
4. Verifier 125 submits data to the home base 415:
   a. Health statistics
   b. Monitoring and reporting data
   c. Current timestamp
   d. Current functionality mode Signer Checks in Referring to FIG. 15, the signer 160 checks in to the home base 415 to get a new shared key (if available) that is needed to sign the answers. Care must be taken with this communication—if the shared key is compromised, malicious intruders could fabricate signed answers.

Figure 16:
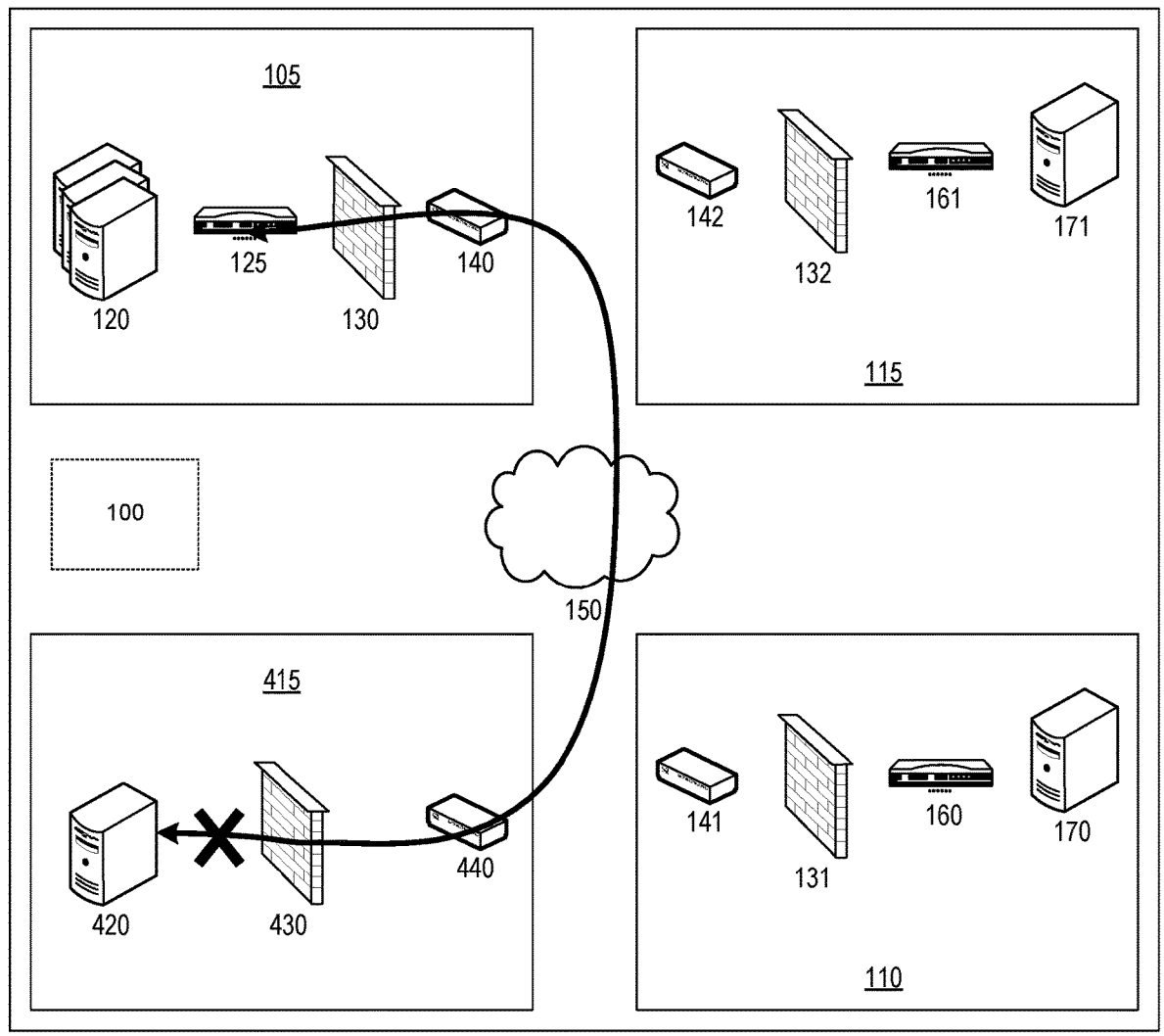
FIG. 16 illustrates an architecture for a third exemplary scenario for maintaining software and configuration of a secure domain name system according to a preferred embodiment of the invention.

The sequence of events is:
1. Signer 160 makes a TCP connection to home base 415 on a pre-determined port via HTTPS, which provides a secure and encrypted path. This connection does not impact the verifying logic, which continues on a separate execution path.
2. Configuration server 420 updates the signer 160, 161:
   a. If a firmware update is available, new firmware is downloaded, device goes into maintenance/bypass mode, and restarts with new firmware.
   b. Current key (if there is a new key, the signer 160, 161 makes the current key Kprevious, and the new key Kcurrent—see the section on key exchange and rollover, described above, for more information).
3. Signer 160, 161 submits data to home base 415:
   a. Health statistics
   b. Monitoring and reporting data
   c. Current timestamp
   d. Current functionality mode Verifier Checks in but Home Base is Unavailable Referring to FIG. 16, if the verifier 125 fails to check in to the home base 415 for some configurable number of consecutive attempts, the verifier 125 will take itself offline because the keys may be out of date.

The sequence of events is:
1. Verifier 125 attempts to make a TCP connection to home base 415 on a pre-determined port, but the home base 415 is down. The failure counter is incremented.
2. If the failure counter has reached a pre-configured value, the verifier 125 takes itself offline because it cannot be sure that the keys that it has in memory are valid. This results in something that looks like the Verifier is Down case described above.
3. Otherwise, the verifier 125 continues processing as normal, setting a timer for the next attempt to check in to the home base 415.

Signer Checks in but Home Base is Unavailable

Figure 17:
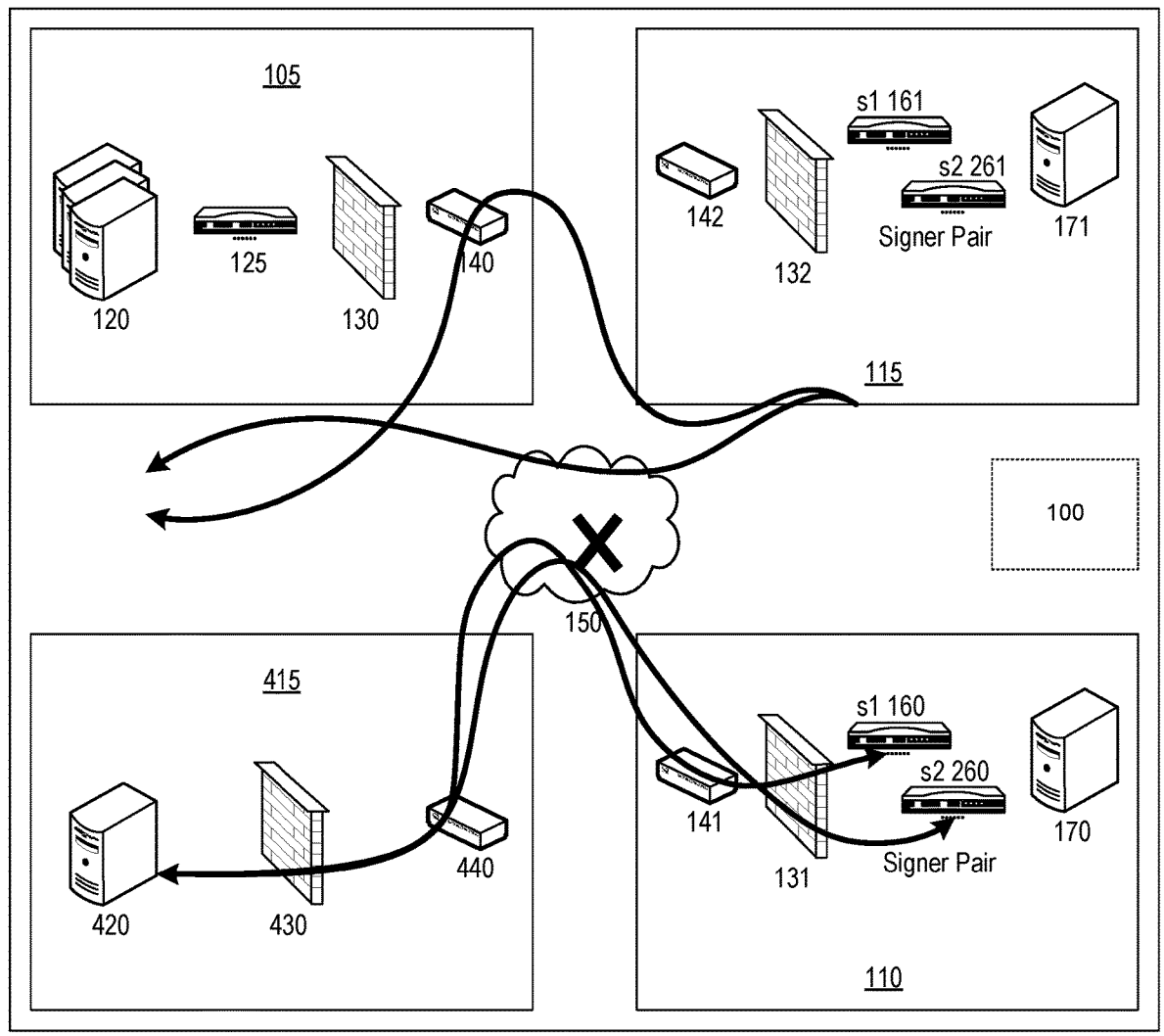
FIG. 17 illustrates an architecture for a fourth exemplary scenario for maintaining software and configuration of a secure domain name system according to a preferred embodiment of the invention.

Referring to FIG. 17, if the signer 160 fails to check in to the home base 415 for some configurable number of consecutive attempts, it will take itself offline because the keys may be out of date. The unfortunate nature of this scenario is that even if the signers 160, 260 are deployed in redundant pairs, a routing error (or similar) could cause both signers to go offline at around the same time.

The sequence of events is:
1. Signer S1 160 attempts to make a TCP connection to home base 415 on a pre-determined port, but the home base 415 is down. The failure counter is incremented.
2. If the failure counter has reached a pre-configured value, the signer S1 160 takes itself offline because it cannot be sure that the keys that it has in memory are valid.

In parallel:
3. Signer S2 260 attempts to make a TCP connection to home base 415 on a pre-determined port, but the home base 415 is down. The failure counter is incremented.
4. If the failure counter has reached a pre-configured value, the signer S2 260 takes itself offline because it cannot be sure that the keys that it has in memory are valid.

Depending on the nature of the connectivity failure, it is possible that both signers will be affected, resulting in the entire signing capabilities being down for that node. As a result, the "failure counter" must be reasonably high (five or more) and the signer must alert if the failure counter exceeds a fairly small number (e.g., two).

Housekeeping Activities

This section deals with housekeeping activities.

Adding a Signer

There are two scenarios for adding a signer.

Adding a New Node

This is a fairly simple scenario. When a new node is deployed, it will be built with multiple authentication components, or signer modules (primary/backup), and the signers will be initialized before the node is added. Adding a signer in this manner has no impact on the verifiers 125.

Adding a New Announcement

This scenario is more complex and would happen if either:
A new authoritative anycast prefix is created.
The present inventors provide a secure DNS system according to a preferred embodiment of the present invention to another DNS provider, (e.g., .biz)

This list will be propagated out via the signer system and managed using the home base application. When a new anycast prefix is added, the home base will provide the updated list to the verifier 125 to download. The verifier will check-in every hour or day (configurable) to get the list of the new anycast prefixes to alert it when it should begin signing packets.

Adding a Verifier in a Pre-Signer Deployment

To expedite deployment, some verifiers 125 may be deployed before a full deployment of authentication components, or signers, in all nodes. In this case, the verifiers 125 need to be in "pass through" mode, where the verifier 125 does not try and sign/encapsulate any DNS questions and does not validate answers.

1. Install the verifier device 125 (powered down in passive mode).
2. Configure (at home base) which authoritative servers 170, 171 the verifier 125 will expect signatures from.
3. Verifier 125 is powered up.
4. Verifier 125 is put into "pass through mode" via SSH using the command line interface (CLI).
5. Verifier 125 checks into home base and gets list of anycast prefixes and keys.
6. Verifier 125 does not flag queries or try to validate answers.
7. Once signer deployment is completed, the system is put into "enable" mode (where flagging and verification is done) using the CLI.
8. Verifier 125 starts flagging queries to known signers 160, 161.
9. Verifier 125 starts validating signatures from known signers 160, 161.

Recursive DNS server 120 is protected.

Adding a Verifier in a Post-Signer Deployment

This is expected to be a frequent occurrence—as implementations of the present invention become more widespread, it is expected that a high number of verifier devices shall be deployed. The sequence of events is:

1. Install the verifier device 125 (powered down in passive mode).
2. Configure (at home base 415) which authoritative servers 170, 171 the verifier 125 will expect signatures from.
3. Verifier 125 is powered up.
4. Verifier 125 checks into home base 415 and gets list of anycast prefixes and keys.
5. Verifier 125 starts flagging queries to known signers 160, 161.
6. Verifier 125 starts validating signatures from known signers 160, 161.
7. Recursive DNS server 120 is protected.

Monitoring Requirements

The DNS provider may require that the authentication component, or signer 160, and the verifier 125 include monitoring functionality such that the status and health of the devices can be determined in real time. This can be a combination of SNMP and remote syslogging.

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system comprising:
a component in serial communication with an authoritative Domain Name System (DNS) server, wherein the component comprises one or more processors that access a corresponding memory, and are configured to:
receive an incoming communication sent by a verification component associated with a recursive DNS server, wherein the incoming communication includes:
(i) a DNS query generated by the recursive DNS server, and
(ii) a first digital signature generated by the verification component;
after validating the first digital signature, send the DNS query included in the incoming communication to the authoritative DNS server;
receive a DNS answer generated by the authoritative DNS server and destined for the recursive DNS server;
determine whether the DNS answer corresponds to the sent DNS query; and
send an outgoing communication to the recursive DNS server via the verification component, wherein the outgoing communication includes the DNS answer and a second digital signature.

2. The system of claim 1, wherein the verification component is in serial communication with the recursive DNS server.

3. The system of claim 1, wherein the outgoing communication to the recursive DNS server is sent after determining that the DNS answer corresponds to the sent DNS query.

4. The system of claim 1, wherein the processors are further configured to:
after the first digital signature is validated, record that the recursive DNS server associated with the DNS query is expecting an answer from the authoritative DNS server, and wherein the determination of whether the DNS answer corresponds to the sent DNS query includes verifying whether the recursive DNS server is recorded as expecting an answer from the authoritative DNS answer.

5. The system of claim 1, wherein the processors are further configured to generate the second digital signature.

6. The system of claim 1, wherein the component is arranged with respect to the authoritative DNS server such that (i) all communications destined for the authoritative DNS server, and (ii) all communications originating from the authoritative DNS server are received at the component.

7. The system of claim 1, wherein the authoritative DNS server and the component are implemented on two separate devices.

8. The system of claim 1, further comprising a second component in serial communication with the component.

9. The system of claim 1, wherein a second verification component is in serial communication with the verification component and the recursive DNS server.

10. The system of claim 1, wherein at least one of the incoming communication and the outgoing communication is encrypted.

11. A method performed by a component in serial communication with an authoritative Domain Name System (DNS) server, the method comprising:
   receiving an incoming communication sent by a verification component associated with a recursive DNS server, wherein the incoming communication includes:
      (i) a DNS query generated by the recursive DNS server, and
      (ii) a first digital signature generated by the verification component;
   after validating the first digital signature, sending the DNS query included in the incoming communication to the authoritative DNS server;
   receiving a DNS answer generated by the authoritative DNS server and destined for the recursive DNS server;
   determining whether the DNS answer corresponds to the sent DNS query; and
   sending an outgoing communication to the recursive DNS server via the verification component, wherein the outgoing communication includes the DNS answer and a second digital signature.

12. The method of claim 11, wherein the verification component is in serial communication with the recursive DNS server.

13. The method of claim 11, wherein the outgoing communication to the recursive DNS server is sent after determining that the DNS answer corresponds to the sent DNS query.

14. The method of claim 11, further comprising:
   after the first digital signature is validated, recording that the recursive DNS server associated with the DNS query is expecting an answer from the authoritative DNS server, and wherein the determination of whether the DNS answer corresponds to the sent DNS query includes verifying whether the recursive DNS server is recorded as expecting an answer from the authoritative DNS answer.

15. The method of claim 11, further comprising generating the second digital signature.

16. The method of claim 11, wherein the component is arranged with respect to the authoritative DNS server such that (i) all communications destined for the authoritative DNS server, and (ii) all communications originating from the authoritative DNS server are received at the component.

17. The method of claim 11, wherein the authoritative DNS server and the component are implemented on two separate devices.

18. The method of claim 11, further comprising a second component in serial communication with the component.

19. The method of claim 11, wherein a second verification component is in serial communication with the verification component and the recursive DNS server.

20. A component in serial communication with an authoritative Domain Name System (DNS) server, comprising one or more processors that access a corresponding memory, and are configured to:
   receive an incoming communication sent by a verification component associated with a recursive DNS server, wherein the incoming communication includes:
      (i) a DNS query generated by the recursive DNS server, and
      (ii) a first digital signature generated by the verification component;
   after validating the first digital signature, send the DNS query included in the incoming communication to the authoritative DNS server;
   receive a DNS answer generated by the authoritative DNS server and destined for the recursive DNS server;
   determine whether the DNS answer corresponds to the sent DNS query; and
   send an outgoing communication to the recursive DNS server via the verification component, wherein the outgoing communication includes the DNS answer and a second digital signature.

* * * * *